US012713086B2

(12) United States Patent
Matsumura et al.

(10) Patent No.: US 12,713,086 B2
(45) Date of Patent: Aug. 18, 2026

(54) SIGNAL PROCESSING APPARATUS AND SIGNAL PROCESSING METHOD

(71) Applicant: SONY GROUP CORPORATION, Tokyo (JP)

(72) Inventors: Yuuki Matsumura, Tokyo (JP); Chisato Kenmochi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 64 days.

(21) Appl. No.: 18/836,582

(22) PCT Filed: Feb. 2, 2023

(86) PCT No.: PCT/JP2023/003342
§ 371 (c)(1),
(2) Date: Aug. 7, 2024

(87) PCT Pub. No.: WO2023/157650
PCT Pub. Date: Aug. 24, 2023

(65) Prior Publication Data

US 2025/0142151 A1 May 1, 2025

(30) Foreign Application Priority Data

Feb. 16, 2022 (JP) ................................ 2022-021753

(51) Int. Cl.
*H04N 21/2665* (2011.01)
*G10L 19/00* (2013.01)
*H04N 21/854* (2011.01)

(52) U.S. Cl.
CPC ......... *H04N 21/2665* (2013.01); *G10L 19/00* (2013.01); *H04N 21/854* (2013.01)

(58) Field of Classification Search
CPC ............ H04N 21/2665; H04N 21/854; H04N 21/2187; G10L 19/00; G10L 19/167; G10L 19/24
See application file for complete search history.

(56) References Cited

U.S. PATENT DOCUMENTS

2016/0007062 A1* 1/2016 Rumereich ........ H04N 21/2665
2017/0076734 A1 3/2017 Subasingha et al.

FOREIGN PATENT DOCUMENTS

JP 2000-092218 A 3/2000
JP 2001-128133 A 5/2001
(Continued)

OTHER PUBLICATIONS

International Search Report and Written Opinion of PCT Application No. PCT/JP2023/003342, issued on Apr. 18, 2023, 10 pages of ISRWO.

(Continued)

*Primary Examiner* — Anthony Bantamoi
(74) *Attorney, Agent, or Firm* — CHIP LAW GROUP

(57) ABSTRACT

The present technology relates to a signal processing apparatus and a signal processing method adapted to suitably combine a plurality of pieces of coded data. The signal processing apparatus of the present technology includes a selection part configured to select, from among a plurality of pieces of coded data obtained by encoding a plurality of media signals, pieces of the coded data targeted for combination without decoding the pieces of coded data, and a combination part configured to combine the pieces of coded data selected as the target for combination. The selection part selects the pieces of coded data targeted for combination on the basis of a degree of importance calculated for each piece of the coded data. The present technology can be applied to systems that implement a remote live event that (Continued)

can be attended by remote audience from outside an event venue.

19 Claims, 15 Drawing Sheets

(56) References Cited

FOREIGN PATENT DOCUMENTS

| | | | | | |
|---|---|---|---|---|---|
| JP | 2011-518342 | A | | 6/2011 | |
| JP | 2013-021466 | A | | 1/2013 | |
| JP | 2014-520473 | A | | 8/2014 | |
| JP | 2019-050576 | A | | 3/2019 | |
| JP | 2020-036225 | A | | 3/2020 | |
| JP | 2020-194030 | A | | 12/2020 | |
| WO | WO-2015044104 | A1 | * | 4/2015 | ........... H04L 65/752 |
| WO | WO-2018224839 | A2 | * | 12/2018 | ......... H04N 21/6405 |

OTHER PUBLICATIONS

“Beyond Live”, The beginning of a new performance culture, URL: https://campaign.naver.com/pr/v/beyondlive/ja/, Jan. 21, 2022.

* cited by examiner

REMOTE AUDIENCE MEMBER 1
REMOTE AUDIENCE MEMBER 2
REMOTE AUDIENCE MEMBER N-1
AUDIO
VIDEO
MOTION INFORMATION
HAPTIC INFORMATION
AUDIO
VIDEO
MOTION INFORMATION
HAPTIC INFORMATION
AUDIO
VIDEO
MOTION INFORMATION
HAPTIC INFORMATION
SERVER
11
AUDIO
VIDEO
HAPTIC INFORMATION
PERFORMER

FIG. 5

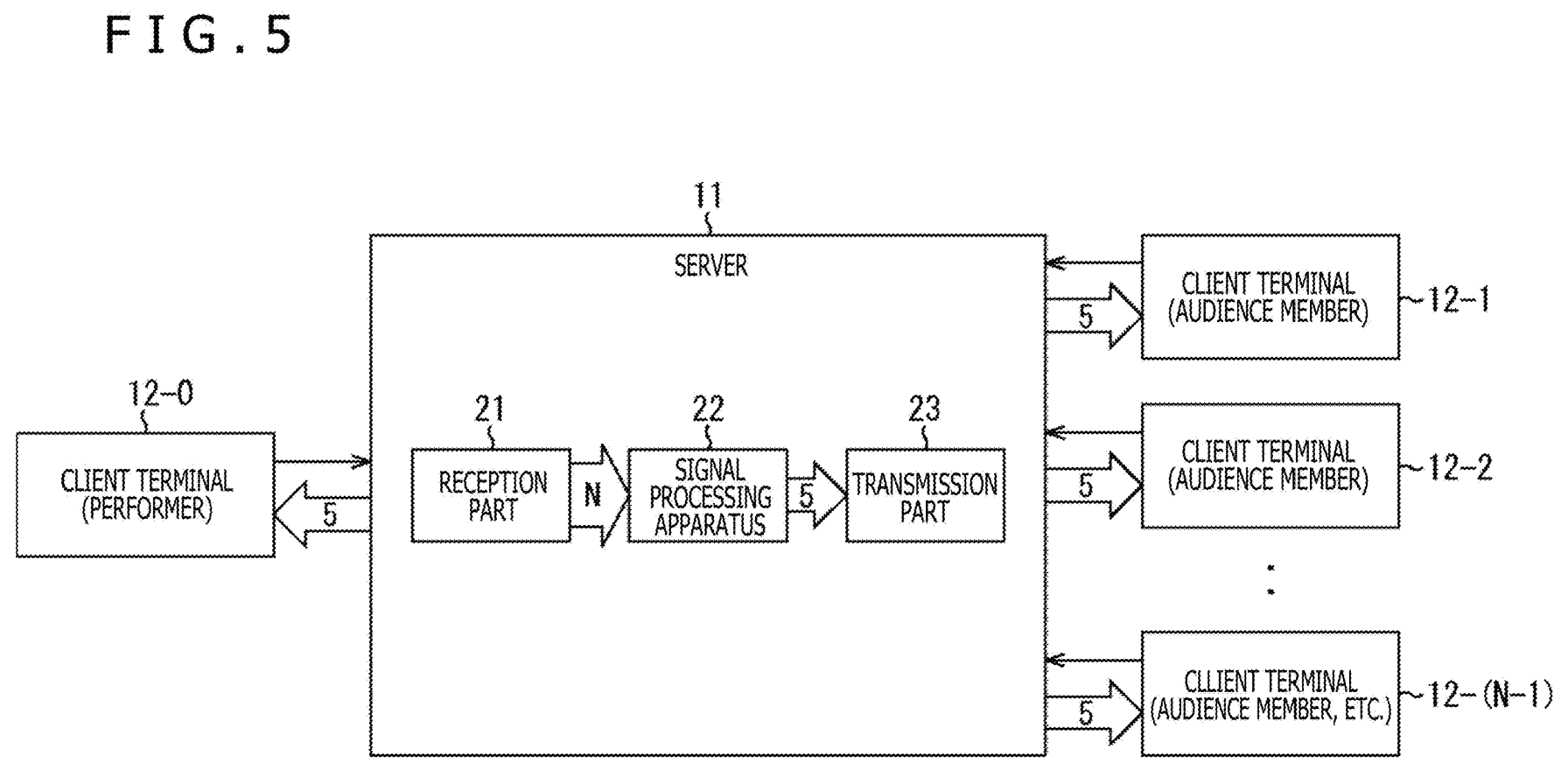

12-0
CLIENT TERMINAL (PERFORMER)

5

11
SERVER

21
RECEPTION PART

N

22
SIGNAL PROCESSING APPARATUS

5

23
TRANSMISSION PART

5

12-1
CLIENT TERMINAL (AUDIENCE MEMBER)

5

12-2
CLIENT TERMINAL (AUDIENCE MEMBER)

5

12-(N-1)
CLIENT TERMINAL (AUDIENCE MEMBER, ETC.)

22
SIGNAL PROCESSING APPARATUS
N PIECES
SELECTION PART
33
N/100 PIECES
COMBINATION PART
34
5 PIECES
ATTRIBUTE INFORMATION
SELECTION NUMBER INFORMATION
DEGREE-OF-IMPORTANCE INFORMATION
31
DEGREE-OF-IMPORTANCE CALCULATION PART
SELECTION NUMBER CALCULATION PART
32
PROCESSING LOAD INFORMATION
COMMUNICATION LOAD INFORMATION

FIG. 7

| ATTRIBUTE INFORMATION | CODED DATA |
|---|---|

FEATURE QUANTITIES OF AUDIO SIGNAL

34
COMBINATION PART
CODED DATA
51-1
DECODING PART
51-2
DECODING PART
FREQUENCY SIGNAL
52-1
FREQUENCY-TIME CONVERSION PART
52-2
FREQUENCY-TIME CONVERSION PART
TIME SIGNAL
53
WEIGHTED ADDITION PART
TIME SIGNAL
54
TIME-FREQUENCY CONVERSION PART
FREQUENCY SIGNAL
55
RE-ENCODING PART
CODED DATA

11
SERVER
5
12
CLIENT TERMINAL
71
RECEPTION PART
5
72
SIGNAL PROCESSING APPARATUS
2
73
REPRODUCTION CONTROL PART
81-1
REPRODUCTION DEVICE
81-2
REPRODUCTION DEVICE

72
SIGNAL PROCESSING APPARATUS
5 PIECES
93
SELECTION PART
3 PIECES
95
COMBINATION PART
2 PIECES
ATTRIBUTE INFORMATION
DEGREE-OF-IMPORTANCE INFORMATION
SELECTION NUMBER INFORMATION
91
DEGREE-OF-IMPORTANCE CALCULATION PART
92
SELECTION NUMBER CALCULATION PART
94
COMBINATION CONTROL PART
PROCESSING LOAD INFORMATION
REPRODUCTION ENVIRONMENT INFORMATION

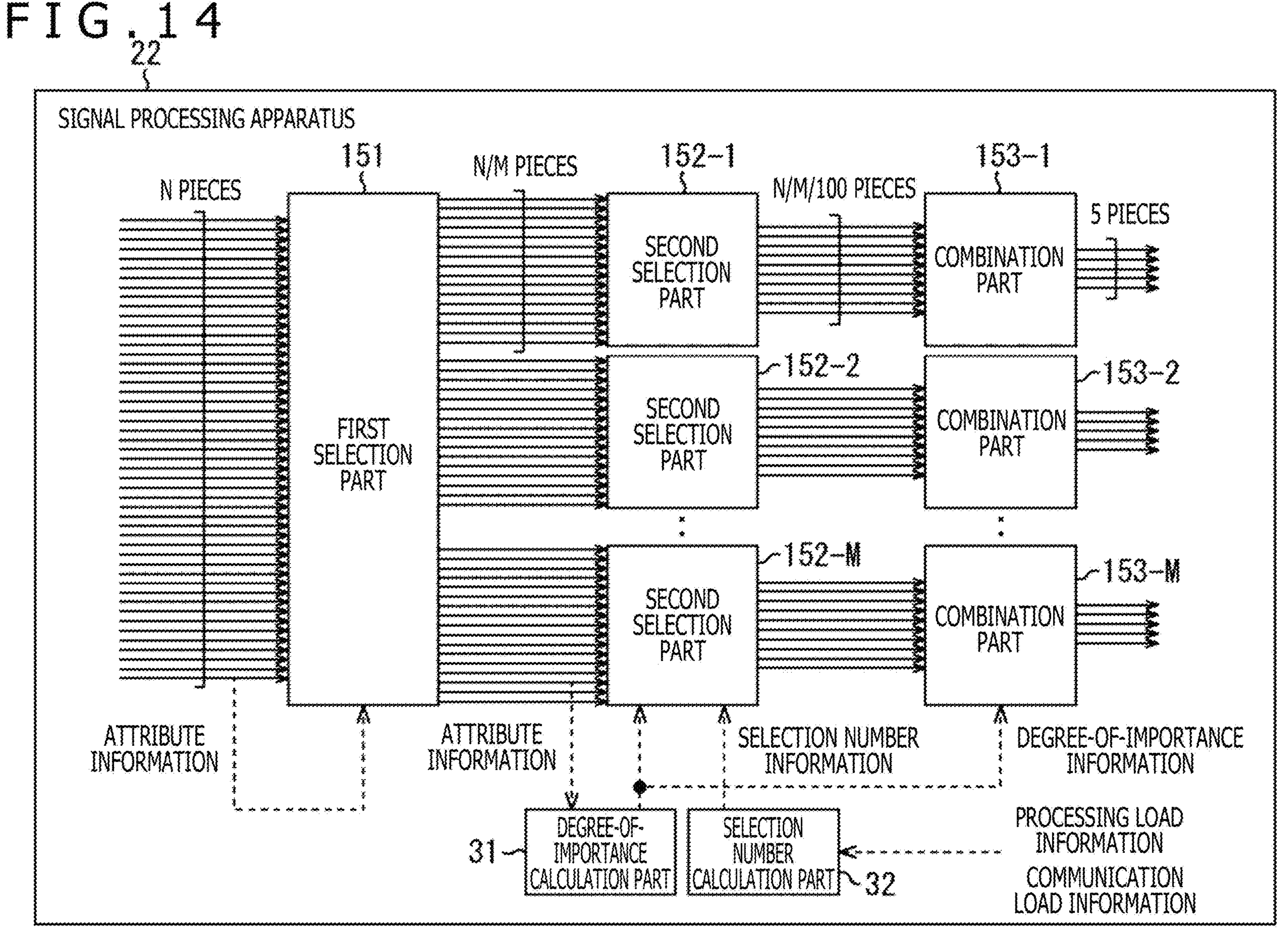
FIG. 14
22
SIGNAL PROCESSING APPARATUS
N PIECES
151
FIRST SELECTION PART
N/M PIECES
152-1
152-2
152-M
SECOND SELECTION PART
N/M/100 PIECES
153-1
153-2
153-M
COMBINATION PART
5 PIECES
ATTRIBUTE INFORMATION
ATTRIBUTE INFORMATION
SELECTION NUMBER INFORMATION
DEGREE-OF-IMPORTANCE INFORMATION
31
DEGREE-OF-IMPORTANCE CALCULATION PART
SELECTION NUMBER CALCULATION PART
32
PROCESSING LOAD INFORMATION
COMMUNICATION LOAD INFORMATION

FIG. 15

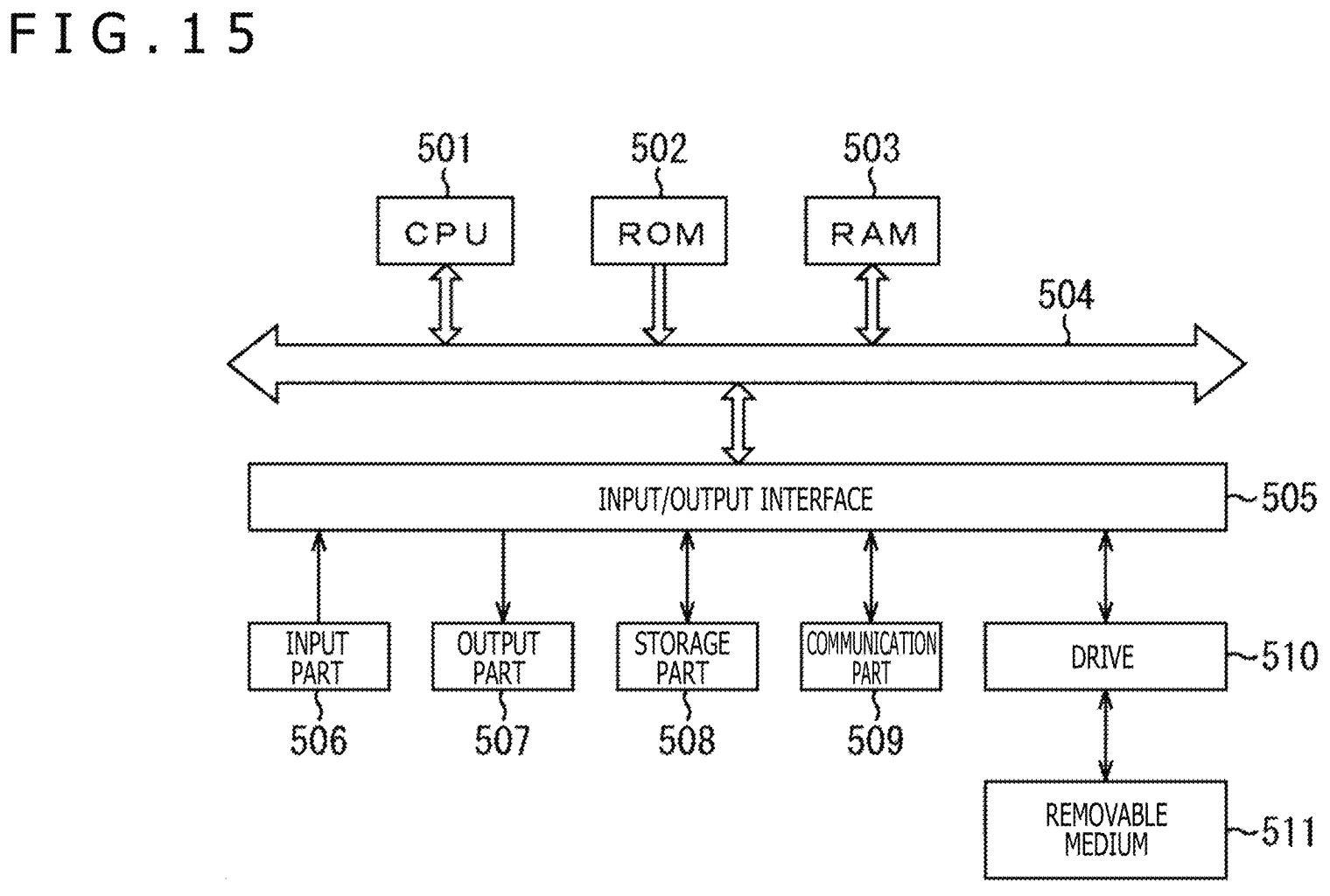

501 CPU
502 ROM
503 RAM
504
INPUT/OUTPUT INTERFACE 505
INPUT PART 506
OUTPUT PART 507
STORAGE PART 508
COMMUNICATION PART 509
DRIVE 510
REMOVABLE MEDIUM 511

SIGNAL PROCESSING APPARATUS AND SIGNAL PROCESSING METHOD

CROSS REFERENCE TO RELATED APPLICATIONS

This application is a U.S. National Phase of International Patent Application No. PCT/JP2023/003342 filed on Feb. 2, 2023, which claims priority benefit of Japanese Patent Application No. JP 2022-021753 filed in the Japan Patent Office on Feb. 16, 2022. Each of the above-referenced applications is hereby incorporated herein by reference in its entirety.

TECHNICAL FIELD

The present technology relates to a signal processing apparatus and a signal processing method. More particularly, the present technology relates to a signal processing apparatus and a signal processing method adapted to suitably combine a plurality of pieces of coded data.

BACKGROUND ART

In recent years, numerous remote live events have been held. In a remote live event, images taken of performance of performers and atmosphere of audience at a live event venue where a musical or theatrical entertainment is being performed are distributed in real time to client terminals used by audience outside the venue (the audience will be referred to as the remote audience hereunder).

PTL 1 through PTL 3 disclose systems that display images reflecting movements of the remote audience so that the audience members will feel they are actually attending an event and have a sense of unity with the performer and with each other.

Further, NPL 1 discloses a system that allows preselected members of the remote audience to have their images and voices picked up using cameras and microphones and transmit media signals representing the collected images and voices to the live event venue in real time.

This system causes display devices at the venue to display images of facial expressions and movements of the remote audience members with their voices output from speakers, the remote audience thereby being able to root for the performer from outside the venue.

These systems cause media signals of the performer and those of the remote audience to be transmitted bidirectionally. It follows that the larger the remote audience, the higher the communication load of the network and the higher the processing load of the server repeating media signal transmissions. To stably run the remote live event thus requires reducing the network communication load and the server processing load.

PTL 4 and PTL 5, for example, disclose a technology in which, of a plurality of pieces of coded data obtained by encoding a plurality of audio signals, those that have the highest energy or are dominant over the other pieces of coded data are selectively transmitted in order to reduce the server processing load.

CITATION LIST

Patent Literature

PTL 1
JP-A-2013-21466
[PTL 2]
JP-A-2019-50576

[PTL 3]
JP-A-2020-194030
[PTL 4]
JP-A-2000-92218
[PTL 5]
JP-T-2011-518342

Non Patent Literature

[NPL 1]
"Beyond LIVE," [online], [searched on Jan. 21, 2022], Internet <URL: https://campaign.naver.com/pr/v/beyondlive/ja/>

SUMMARY

Technical Problem

However, transmitting the dominant coded data alone to the client terminals of the remote audience allows, for example, only the voice of the performer and the cheers of noisy audience members to be reproduced. As a result, the remote audience is unable to experience a sense of presence at the live event attended by ten thousand to one hundred thousand of people, for example.

Meanwhile, in order to preserve a sense of presence at a remote live event, attempts could be made by a server to decode all pieces of coded data transmitted from each remote audience member, to obtain media signals, combine the acquired media signals, and again encode the combined media signals for transmission back to each client terminal. This, however, would increase the server processing load with concomitant delays caused by the processing of the server.

The present technology has been devised in view of the above circumstances and aims to suitably combine a plurality of pieces of coded data.

Solution to Problem

According to one aspect of the present technology, there is provided a signal processing apparatus including a selection part configured to select, from among a plurality of pieces of coded data obtained by encoding a plurality of media signals, pieces of the coded data targeted for combination without decoding the pieces of coded data, and a combination part configured to combine the pieces of coded data selected as the target for combination.

According to one aspect of the present technology, there is provided a signal processing method for causing a signal processing apparatus to perform selecting, from among a plurality of pieces of coded data, pieces of the coded data targeted for combination without decoding the pieces of coded data, and combining media signals obtained by decoding the pieces of coded data selected as the target for combination.

According to one aspect of the present technology, from among a plurality of pieces of coded data, pieces of the coded data targeted for combination are selected without being decoded, and media signals obtained by decoding the pieces of coded data selected as the target for combination are combined.

BRIEF DESCRIPTION OF DRAWINGS

FIG. 5 is a block diagram depicting an exemplary configuration of a server.

FIG. 7 is a view depicting an example of data transmitted from a client terminal.

FIG. 14 is a view depicting another detailed exemplary configuration of the signal processing apparatus.

FIG. 15 is a block diagram depicting an exemplary hardware configuration of a computer.

DESCRIPTION OF EMBODIMENTS

Some embodiments for implementing the present technology are described below. The description will be given under the following headings in this order:

1. Overview of remote live system
2. Configuration and operation of server
3. Configuration and operation of client terminal
4. Alternative examples

1. Overview of Remote Live System

Figure 1:
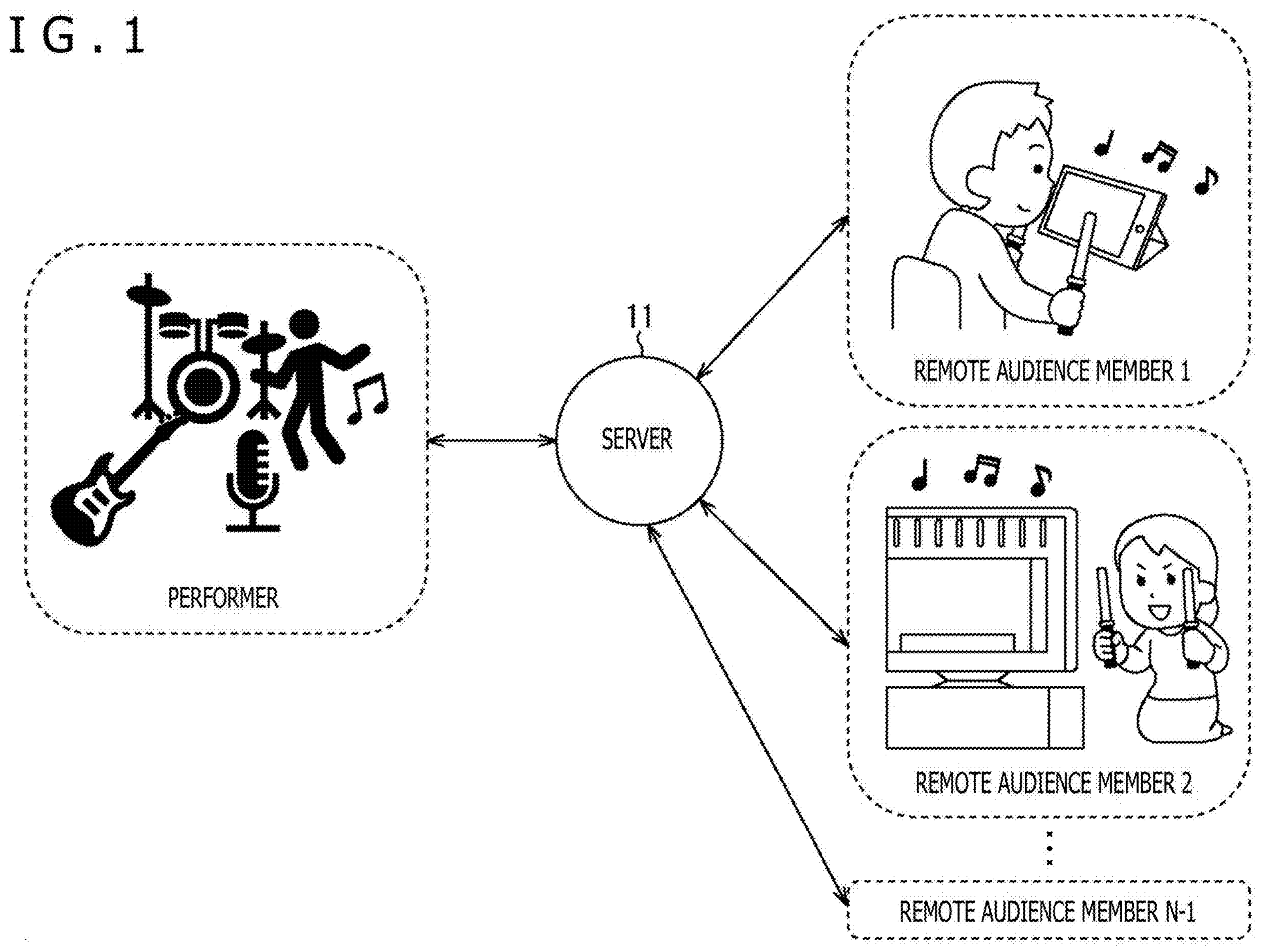
FIG. 1 is a view depicting an exemplary configuration of a remote live system as an embodiment to which the present technology is applied.

FIG. 1 is a view depicting an exemplary configuration of a remote live system as an embodiment to which the present technology is applied.

The remote live system implements a remote live event in which, from a live event venue where a musical or theatrical entertainment is being performed, images of how a performer is performing and the like are distributed in real time to client terminals used by remote audience outside the venue.

The example in FIG. 1 indicates remote audience members 1 through N−1 attending the remote live event at locations outside the live event venue such as private homes and karaoke facilities. For example, the remote audience member 1 is attending the remote live event by using a tablet terminal, whereas the remote audience member 2 is participating in the same event by using a PC (Personal Computer). The users of the remote live system are the performer and the remote audience members experiencing the remote live event together.

The remote live system in FIG. 1 is configured with a server 11 managed by a remote live event administrator and with client terminals used by the performer side and by the remote audience members 1 through N−1, the server 11 and the client terminals being interconnected by a network such as the Internet. Note that, the client terminal used by the performer side and the server 11 may directly be connected with each other in a wired or wireless manner.

Acquired at the live event venue are a video signal representing the performance of the performer, an audio signal picking up the voice of the performer and other sounds, and a haptic signal reproducing a haptic sensation of shaking hands with the performer, for example. Note that, in the case where there is also audience at the live event venue, a video signal representing both the performance of the performer and the atmosphere of the audience as well as an audio signal picking up both the voice of the performer and the cheers and other sounds of the audience may be acquired at the venue.

Further, acquired at the client terminals of the remote audience side are video signals representing faces and movements of the remote audience members 1 through N−1, audio signals picking up the cheers, applause, and interjections of the remote audience, and haptic signals. The haptic signals provide the basis for reproducing, for example, how the remote audience members come into physical contact with each other such as through a high-five, how strongly they grip their penlights, and how vigorously they swing the penlights. Note that, motion information representing motions of the penlights held by the remote audience members at the client terminals of the remote audience side may be acquired in place of the video signals.

Figure 2:
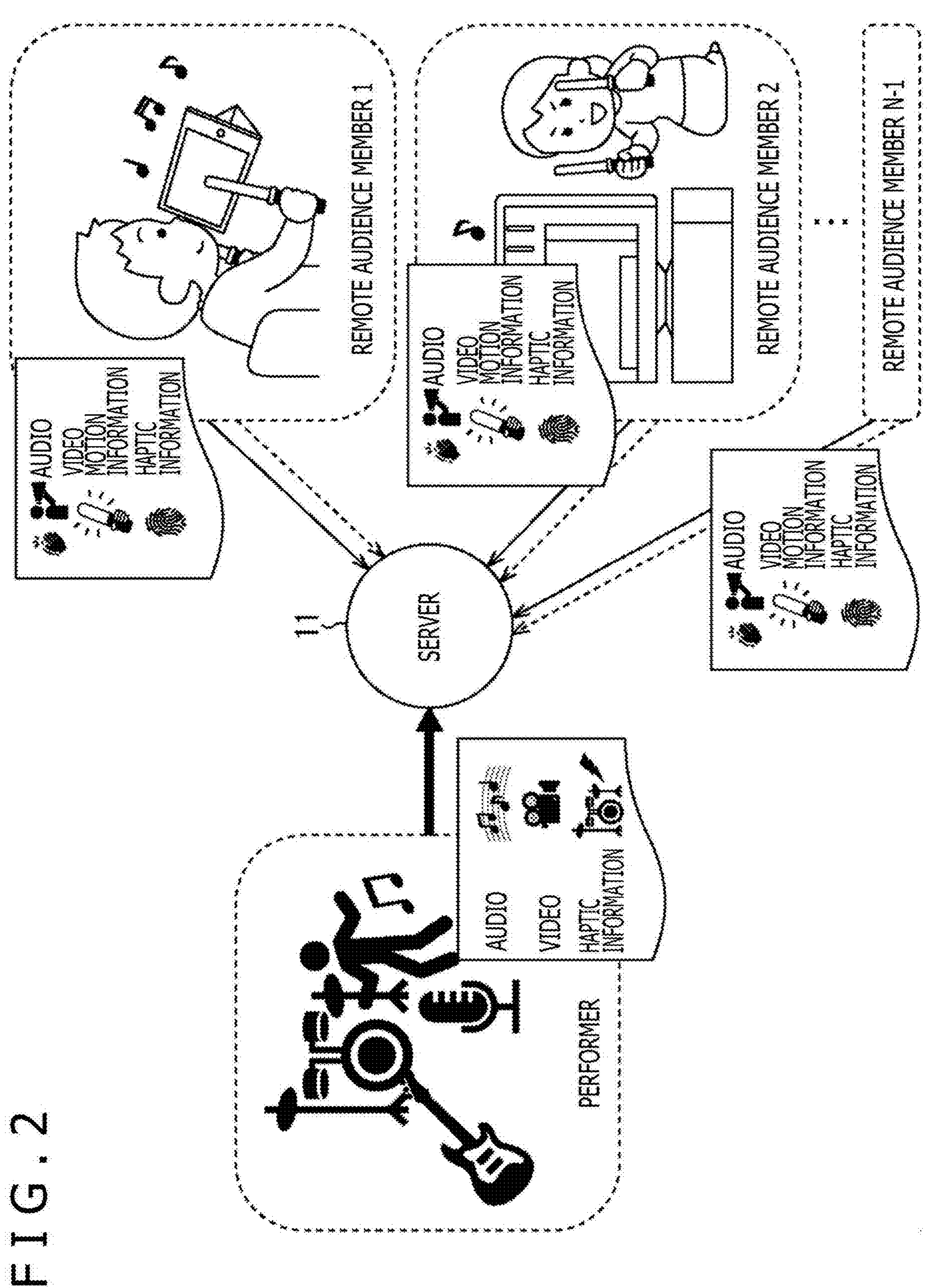
FIG. 2 is a view depicting an example of transmitted data.

As indicated by solid-line arrows in FIG. 2, what is transmitted to the server 11 during the remote live event includes media signals including the video signal, audio signal, and haptic signal acquired by the performer side at the live event venue, and media signals including the video signals, audio signals, and haptic signals of the remote audience side obtained at the client terminals used by the remote audience members 1 through N−1. Also, as indicated by broken-line arrows, attribute information representing feature quantities of the individual media signals of the remote audience side is transmitted from the client terminals used by the remote audience members 1 through N−1 to the server 11.

Figure 3:
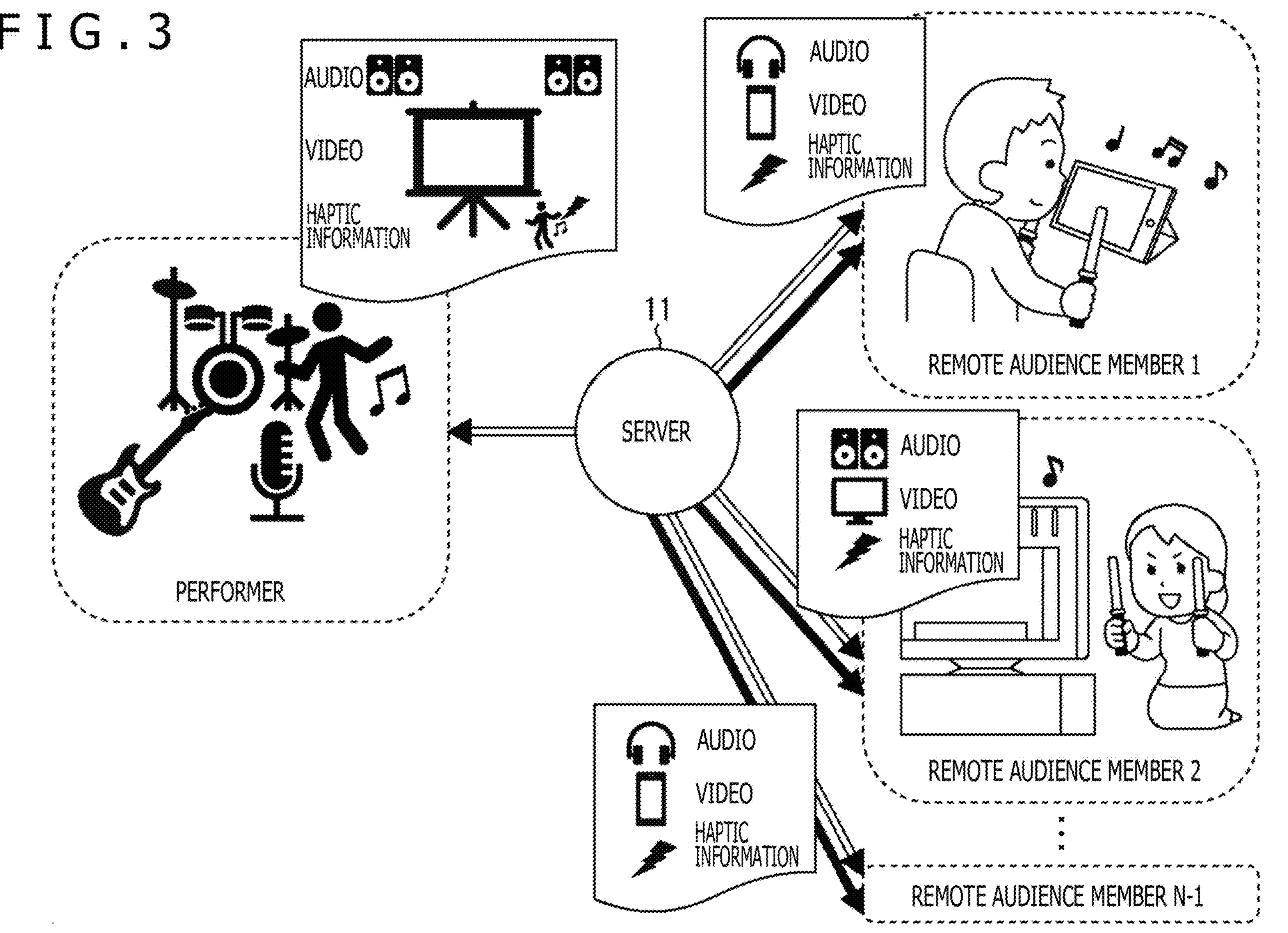
FIG. 3 is a view depicting another example of transmitted data.

In this case, as indicated by solid-line arrows in FIG. 3, the server 11 transmits the media signals of the performer side to the client terminals used by the remote audience members 1 through N−1. Further, the server 11 combines the media signals of each type on the remote audience side based on their attribute information, and transmits the media signals thus obtained to both the client terminal used by the performer side and the client terminals used by the remote audience members 1 through N−1, as indicated by double-line arrows in FIG. 3.

Figure 4:
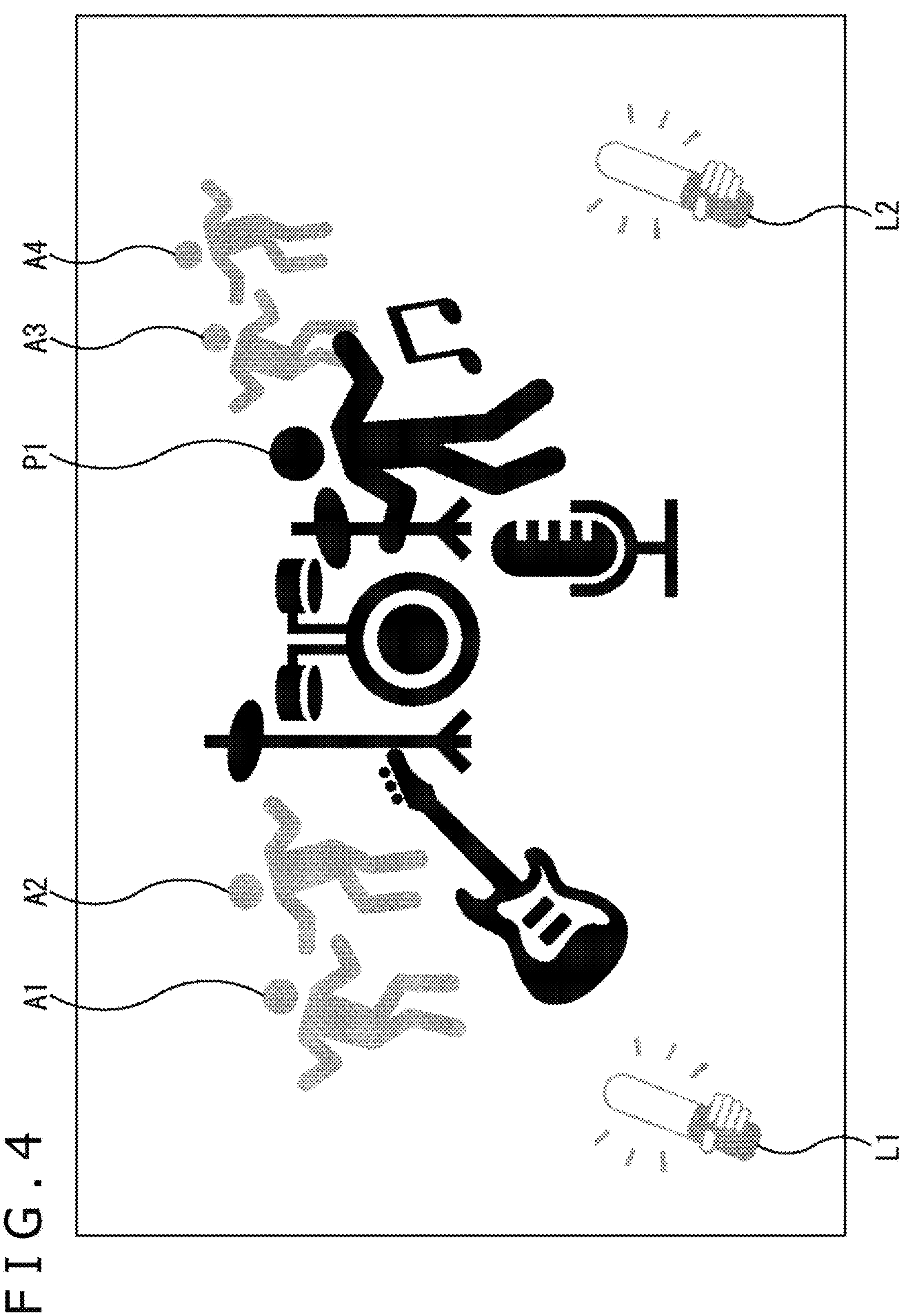
FIG. 4 is a view depicting how things look like at a live venue.

At the live event venue, the media signals transmitted from the server 11 are reproduced on display devices set up around a performer P1 as depicted in FIG. 4, for example, the display devices displaying images of remote audience members A1 through A4 and images of penlights L1 and L2 reproducing the motions of the penlights held by remote audience members. The depiction in FIG. 4 of the remote audience members A1 through A4 and the penlights L1 and L2 in light grey means that they are in reality absent at the live event venue where the performer is present.

Note that, in a case such as a VR (Virtual Reality) remote live event where the remote audience experiences the live evet in a virtual space, the remote audience members A1 through A4 and the penlights L1 and L2 are displayed around the performer P1 in the virtual space, for example.

In the remote live system, the media signals of the performer side and those of the remote audience side are transmitted bidirectionally. This means that the larger the remote audience, the higher the communication load of the network and the higher the processing load of the server 11 managing and repeating media signal transmissions. To stably run the remote live event thus requires reducing the network communication load and the processing load of the server 11.

The media signals of the performer side and those of the audience side are transmitted in the form of compressed coded data obtained by compressing the media signals of each type with use of a predetermined coding system in order to reduce the network communication load. In this case, the server 11 is required to decode a plurality of pieces of coded data to obtain a plurality of media signals, combine the acquired media signals, and again encode the combined media signals. It follows that the processing load of the server 11 increases in proportion to the number of pieces of the coded data targeted for combination, with further delays caused by processes including decoding and re-encoding of the coded data.

In order to reduce the server processing load, PTL 4 and PTL 5 describe, for example, schemes to selectively transmit the coded data that has the highest energy or is dominant from among the plurality of pieces of coded data obtained by encoding a plurality of audio signals. The technology disclosed in PTL 4 and PTL 5 is presumed to be applied to situations where the number of connections is limited such as a remote conference. It is thus possible to reduce the server processing load by use of the techniques of selectively transmitting only the dominant coded data without detracting from realistic sensations of the remote conference.

However, transmitting only the dominant coded data to the client terminals of the remote audience causes solely the voice of the performer and the loud cheers of limited audience to be reproduced, for example. This does not allow the remote audience to have the sense of presence at a live event attended by ten thousand to one hundred thousand of people, for example.

Meanwhile, if the server 11 attempts to decode all pieces of coded data transmitted from each remote audience member to obtain media signals, combine the acquired media signals, and again encode the combined media signals in order to preserve a sense of presence at a remote live event, there will be problems of an increased processing load with concomitant delays as discussed above.

Under those circumstances, in traditional remote live and sports live events, as disclosed in NPL 1, for example, some remote audience members have been preselected to have their images and voices reflected at the live event venue. As one technique to have the reactions of the remote audience side such as cheers and applause reflected at the live event venue, the remote audience members are expected to operate buttons on their user interface to get prerecorded cheers and applause reproduced in synthesis at the live event venue. As a result, the remote audience can only experience a limited sense of presence far from the realistic sensations of the actual live event.

One embodiment of the present technology has been made in view of the above circumstances and proposes a technology that combines numerous pieces of coded data while reducing processing loads and delays in a large-scale bidirectional remote live event in order to implement a remote live event with highly realistic sensations.

2. Configuration and Operation of Server

FIG. 5 is a block diagram depicting an exemplary configuration of the server 11.

In the example in FIG. 5, the server 11 is connected with client terminals 12-0 through 12-(N−1). The client terminal 12-0 is for use by the performer side, and the client terminals 12-1 through 12-(N−1) are used by the remote audience members 1 through N−1, respectively. Here, the number of remote live connections is given as N. In the description that follows, in a case where there is no need to distinguish the client terminals 12-0 through 12-(N−1) from each other, they will simply be referred to as the client terminal 12.

The server 11 repeats coded data transmissions between the client terminals 12-0 through 12-(N−1). The coded data obtained by encoding the video signals, audio signals, and haptic signals acquired by the client terminals 12-0 through 12-(N−1) are transmitted therefrom to the server 11. Note that, in the ensuing description, for the purpose of simple explanation, only the coded data obtained by encoding the audio signals is assumed to be transmitted from the client terminals 12-0 through 12-(N−1).

Given that the sound of the performer side is the main content of the live music event, the audio signal of the performer side can be arranged to be a multichannel signal having numerous channels. Meanwhile, given that the sound on the audience side includes cheers and applause, the audio signals on the audience side may need only be two-channel or one-channel signals.

As depicted in FIG. 5, the server 11 includes a reception part 21, a signal processing apparatus 22, and a transmission part 23.

The reception part 21 receives N pieces of coded data transmitted from the client terminals 12-0 through 12-(N−1) and supplies the received data to the signal processing apparatus 22.

The signal processing apparatus 22 selects the coded data targeted for combination from among the N pieces of coded data supplied from the reception part 21. The signal processing apparatus 22 combines the pieces of coded data selected as the target for combination to generate five pieces of coded data, for example, before supplying the generated data to the transmission part 23.

The transmission part 23 transmits the five pieces of coded data to each of the client terminals 12-0 through 12-(N−1). Here, the same coded data is transmitted to the client terminals 12-0 through 12-(N−1).

Figure 6:
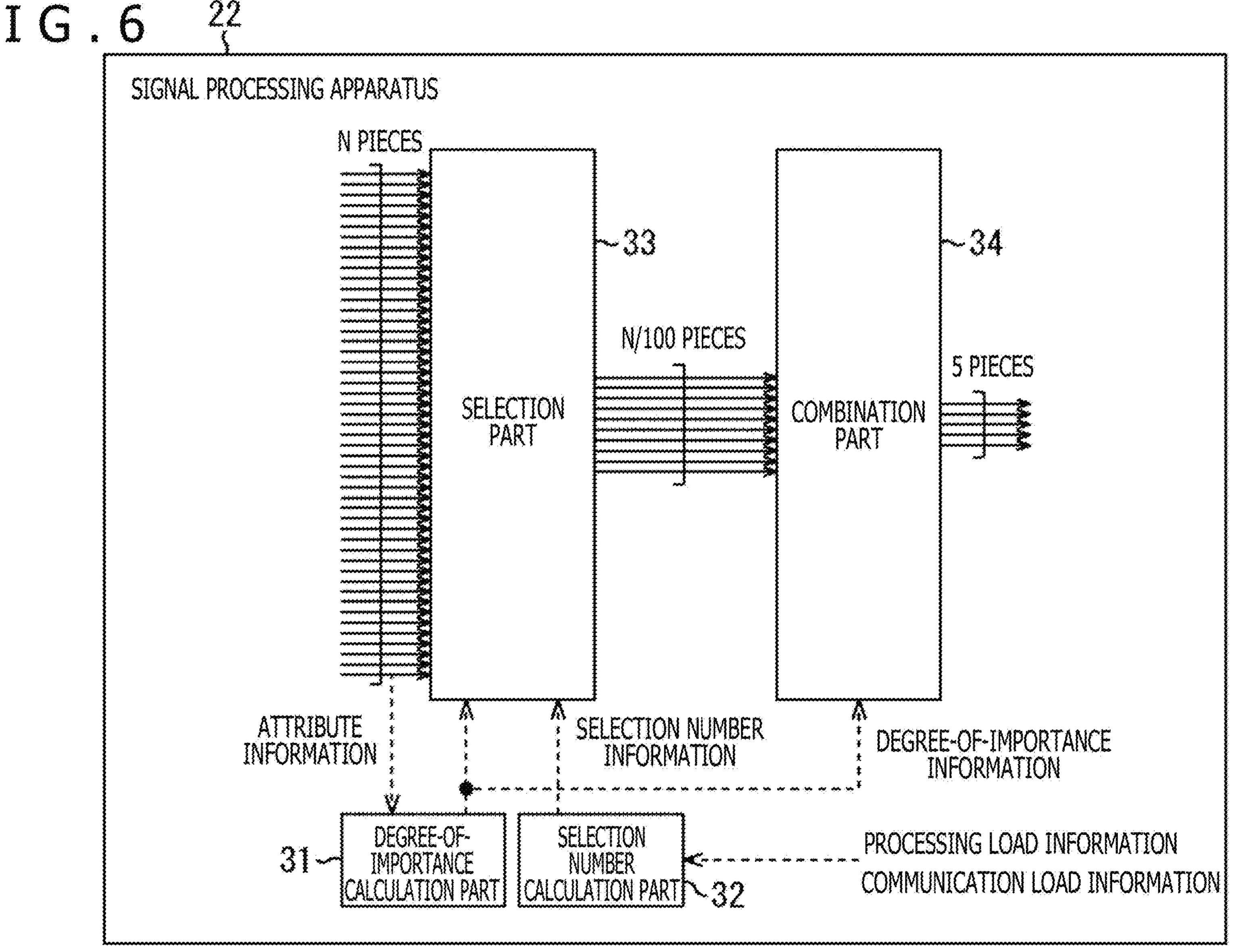
FIG. 6 is a view depicting a detailed exemplary configuration of a signal processing apparatus.

FIG. 6 is a view depicting a detailed exemplary configuration of the signal processing apparatus 22.

As depicted in FIG. 6, the signal processing apparatus 22 includes a degree-of-importance calculation part 31, a selection number calculation part 32, a selection part 33, and a combination part 34.

The degree-of-importance calculation part 31 calculates the degree of importance for each piece of the coded data based on the attribute information corresponding to each of the N pieces of coded data supplied from the reception part 21.

Figure 7:
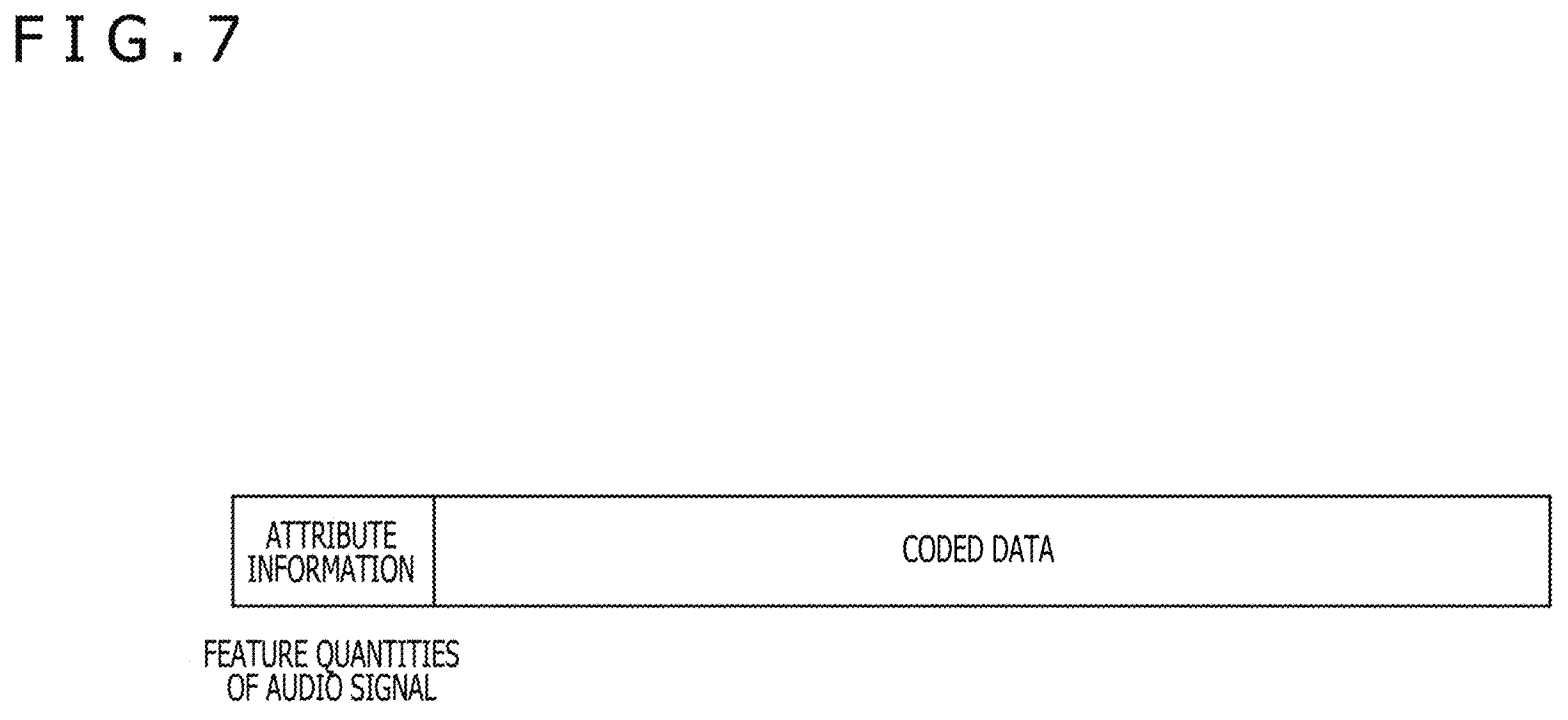

FIG. 7 is a view depicting an example of data transmitted from the client terminal 12.

The client terminal 12 acquires through analysis the feature quantities of the audio signal before encoding. The feature quantities of the audio signal include, for example, the size of the signal, the degree of change of the signal, and the type of the signal. The type of the audio signal indicates whether the sound of the remote audience is cheers, applause, rhythmic hand clapping, or the like. The client terminal 12 acquires the attribute information indicative of the feature quantities obtained through analysis, attaches the acquired attribute information to the coded data obtained by encoding the audio signal, and transmits the coded data together with the attribute information to the server 11, as depicted in FIG. 7.

The degree-of-importance calculation part 31 in FIG. 6 supplies the selection part 33 and the combination part 34 with degree-of-importance information indicative of the degree of importance calculated on the basis of the attribute information attached to each piece of the coded data.

The selection number calculation part 32 calculates the number of pieces of the coded data to be selected by the selection part 33 as the target for combination, on the basis of processing load information indicative of the processing load of the server 11, communication load information indicating the network communication load, and the like.

Specifically, in the case where there is some latitude in the processing load of the server 11, the selection number calculation part 32 increases the number of pieces of the coded data to be selected as the target for combination; in the case where there is little latitude in the processing load of the server 11, the selection number calculation part 32 reduces the number of pieces of the coded data to be selected to be combined. Further, in the case where there is some latitude in the network communication load, the selection number calculation part 32 increases the number of pieces of the coded data to be selected as the target for combination, so as to transmit as many pieces of coded data as possible; in the case where there is little latitude in the network communication load, the selection number calculation part 32 reduces the number of pieces of the coded data to be selected to be combined.

The selection number calculation part 32 supplies the selection part 33 with selection number information indicative of the number of pieces of the coded data to be selected as the target for combination.

On the basis of the degree of importance calculated by the degree-of-importance calculation part 31 for each piece of the coded data, the selection part 33 selects, without decoding, the coded data to be selected as the target for combination from among the pieces of coded data supplied from the reception part 21. For example, in the case where the attribute information indicates the size of the signal, the selection part 33 can preferentially select as the target for combination the coded data obtained by encoding the audio signal picking up loud cheers, applause, and the like, the selection being made on the basis of the degree of importance calculated in reference to the attribute information.

In the example in FIG. 6, as many as N/100 pieces of coded data are selected as the target for combination. Since the number of pieces of the coded data to be selected for combination is determined on the basis of the processing load of the server 11 and the network communication load, it is possible to implement a remote live event with more realistic sensations in the case where there is some latitude in the server processing load and the network communication load. Further, even in the case where there is little latitude in the server processing load and the network communication load, it is possible to implement a remote live event stably with no intermittent or missing data. Note that, all N pieces of coded data transmitted from the client terminal 12 may be selected as the target for combination.

The selection part 33 supplies the combination part 34 with the N/100 pieces of coded data selected as the target for combination. The pieces of coded data not selected to be combined are discarded.

The combination part 34 weights the N/100 pieces of coded data supplied from the selection part 33, according to the degree of importance calculated for the coded data, and combines the weighted pieces of data into five pieces of coded data for output.

Figure 8:
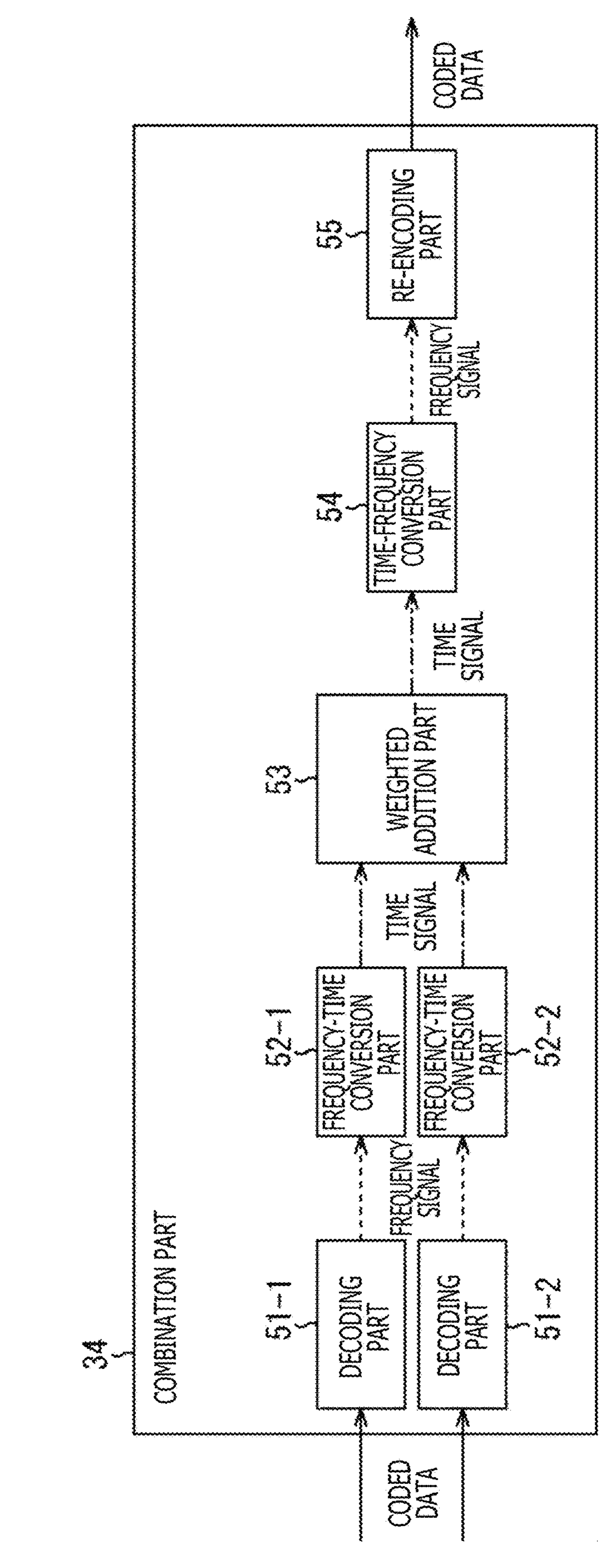
FIG. 8 is a block diagram depicting a detailed exemplary configuration of a combination part.

FIG. 8 is a block diagram depicting a detailed exemplary configuration of the combination part 34.

As depicted in FIG. 8, the combination part 34 includes decoding parts 51-1 and 51-2, frequency-time conversion parts 52-1 and 52-2, a weighted addition part 53, a time-frequency conversion part 54, and a re-encoding part 55.

Explained here is an example in which two pieces of coded data targeted for combination are combined into one piece of coded data. The combination part 34 includes as many decoding parts and frequency-time conversion parts as the number of pieces of the coded data targeted for combination. The combination part 34 further includes as many time-frequency conversion parts and re-encoding parts as the number of pieces of coded data generated by combining the coded data.

It is assumed below that the encoding method in use for generating coded data is what is known as transform coding. In this case, a time signal in units of a frame, which is a predetermined processing time unit, is converted to a frequency signal. In turn, the frequency signal is encoded efficiently to generate a coded audio signal. Further, after being decoded from the coded data, the frequency signal is converted to the time signal. This is how the coded data is decoded.

The decoding parts 51-1 and 51-2 decode the coded data selected as the target for combination, so as to restore the frequency signal. The decoding part 51-1 supplies the restored frequency signal to the frequency-time conversion part 52-1. The decoding part 51-2 supplies the restored frequency signal to the frequency-time conversion part 52-2.

The frequency-time conversion parts 52-1 and 52-2 convert back to the original time signals the frequency signals transmitted from the decoding parts 51-1 and 51-2, respectively. The frequency-time conversion parts 52-1 and 52-2 then supply the time signals to the weighted addition part 53.

The weighted addition part 53 combines the time signals supplied from the frequency-time conversion parts 52-1 and 52-2, by adding the result of multiplication of each time signal by a weighting coefficient corresponding to the degree of importance. The weighted addition part 53 supplies the combined time signals to the time-frequency conversion part 54. Note that, the time signals may be added up without being weighted.

The time-frequency conversion part 54 converts to the frequency signals the time signals supplied from the weighted addition part 53 and supplies the resulting frequency signals to the re-encoding part 55.

The re-encoding part 55 re-encodes the frequency signals supplied from the time-frequency conversion part 54 and outputs the resulting coded data.

In the case where five pieces of coded data are generated by combining N/100 pieces of coded data, the combination part 34 in FIG. 8 is required to perform decoding N/100 times and carry out encoding five times. In this case, there is a possibility that the conversion with a high processing load from frequency signals to time signals and from time signals to frequency signals can increase the processing load of the server 11 while generating processing delays concomitant to framing of the conversion. In view of this, the combination part 34 can be configured in such a manner that the frequency signals decoded from the coded data are combined into the frequency signal without being converted to time signals, the frequency signal being thereafter encoded.

Figure 9:
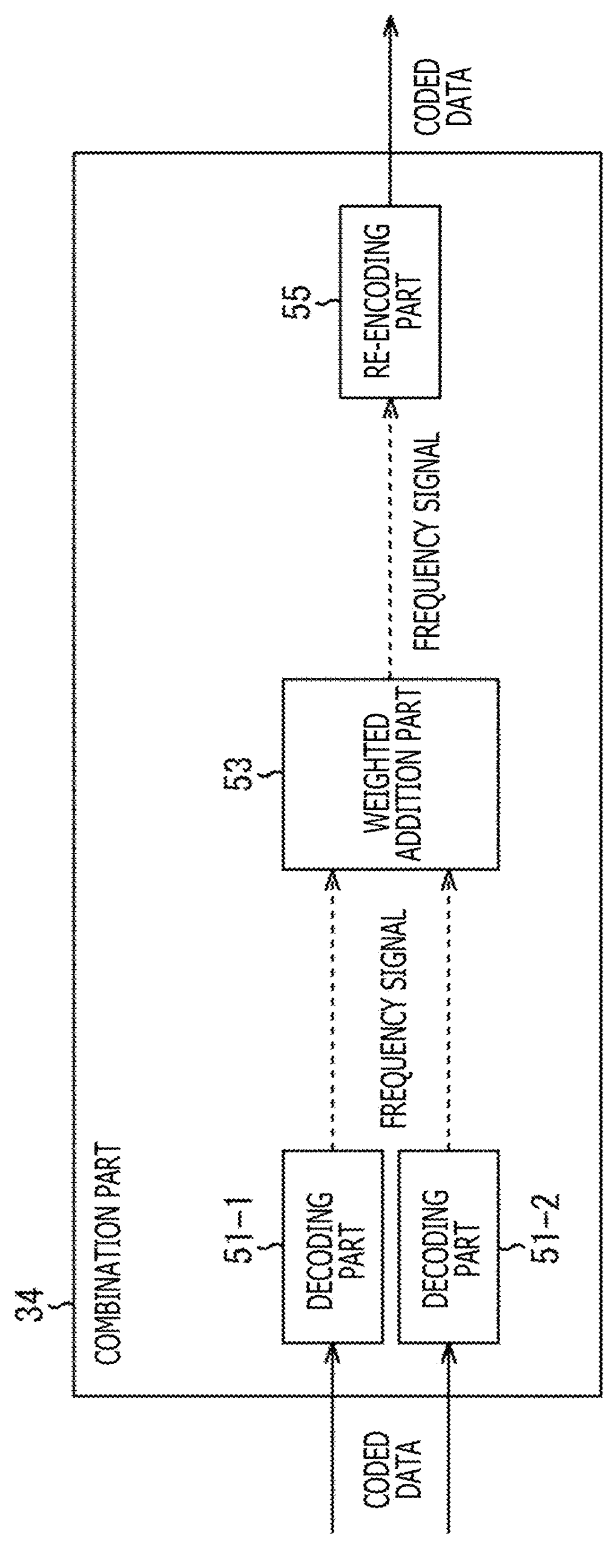
FIG. 9 is a block diagram depicting another detailed exemplary configuration of the combination part.

FIG. 9 is a block diagram depicting another detailed exemplary configuration of the combination part 34. In FIG. 9, the same constituent elements as those in FIG. 8 are given the same reference signs. Redundant explanations are omitted where appropriate.

The configuration of the combination part 34 in FIG. 9 is different from that of the combination part 34 in FIG. 8 in that the frequency-time conversion parts 52-1 and 52-2 and the time-frequency conversion part 54 are not provided.

The decoding parts 51-1 and 51-2 supply the restored frequency signals to the weighted addition part 53.

The weighted addition part 53 combines the frequency signals supplied from the decoding parts 51-1 and 51-2 by adding the result of the multiplication of each of the frequency signals by a weighting coefficient corresponding to the degree of importance. The weighted addition part 53 supplies the combined frequency signals to the re-encoding part 55.

The re-encoding part 55 re-encodes the frequency signals supplied from the weighted addition part 53 and outputs the resulting coded data.

As described above, the pieces of coded data are combined without recourse to the conversion with the highest processing load from frequency signals to time signals and from time signals to frequency signals. This makes it possible to reduce the processing load of the server 11 and suppress concomitant delays.

Figure 10:
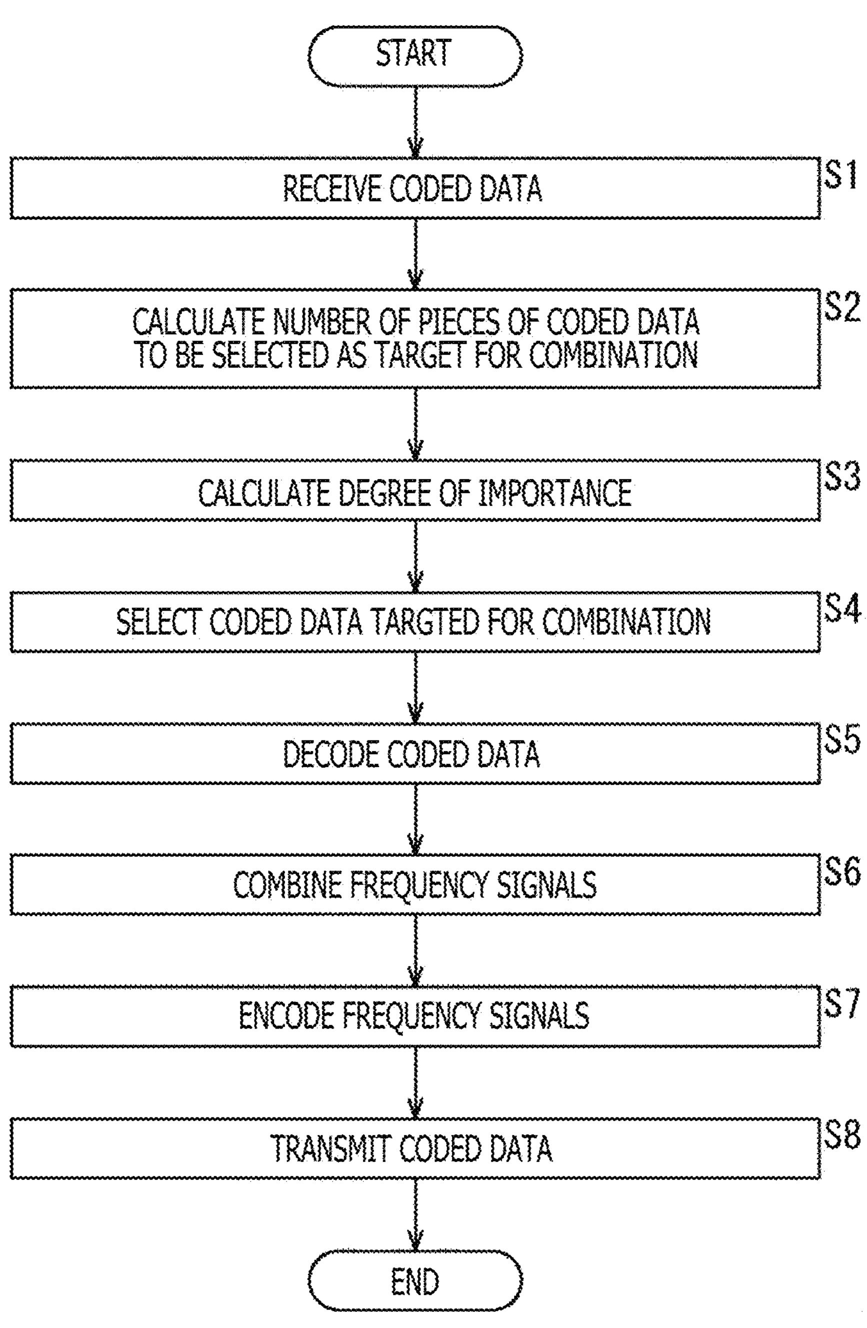
FIG. 10 is a flowchart explaining a process performed by the server.

Explained next with reference to the flowchart of FIG. 10 is the process carried out by the server 11 configured as described above.

In step S1, the reception part 21 receives the coded data transmitted from the client terminal 12.

In step S2, the selection number calculation part 32 calculates the number of pieces of coded data to be selected as the target for combination.

In step S3, the degree-of-importance calculation part 31 calculates the degree of importance for each piece of the coded data received by the reception part 21, the calculation being made on the basis of the attribute information corresponding to each piece of the coded data.

In step S4, from among the pieces of coded data received by the reception part 21, the selection part 33 selects, without decoding, the coded data targeted for combination on the basis of the degree of importance of each piece of the coded data.

In step S5, the decoding parts 51-1 and 51-2 decode the coded data selected as the target for combination in order to restore the frequency signals.

In step S6, the weighted addition part 53 combines the frequency signals.

In step S7, the re-encoding part 55 encodes the combined frequency signals.

In step S8, the transmission part 23 transmits to the client terminal 12 the coded data obtained by encoding the combined frequency signals.

As described above, from among a plurality of pieces of coded data transmitted from the client terminal 12, the server 11 selects the coded data targeted for combination without decoding the coded data. Only the pieces of coded data selected as the target for combination are decoded and combined.

In the case where the server 11 is to acquire the feature quantities of the audio signals used in selecting the coded data targeted for combination, the server 11 is required to analyze the audio signals obtained by temporarily decoding the coded data. Alternatively, the server 11 can also acquire the feature quantities of the audio signals by partially decoding the coded data and by referencing relevant parameters (e.g., global gain) in a syntax specific to the encoding method in use. However, the high processing load involved in decoding the coded data makes it unrealistic for the server 11 to acquire the feature quantities of the audio signals.

Therefore, in the remote live system of the present technology, the client terminal 12 acquires the feature quantities of the audio signals by analyzing the signals prior to encoding and transmits the coded data together with the attribute information indicative of the acquired feature quantities to the server 11. This enables the server 11 to use the feature quantities of the audio signals in selecting the coded data targeted for combination without decoding the coded data. As a result, the server 11 can implement a remote live event with highly realistic sensations by combining numerous pieces of coded data while reducing the processing load and suppressing concomitant delays.

3. Configuration and Operation of Client Terminal

At the venue where the remote audience attends a remote live event, there are provided a video input apparatus, an audio input apparatus, a haptic input apparatus, a video output apparatus, an audio output apparatus, and a haptic output apparatus along with the client terminal 12, for example. The video input apparatus, the audio input apparatus, the haptic input apparatus, the video output apparatus, the audio output apparatus, and the haptic output apparatus are connected to the client terminal 12.

The remote audience attends the remote live event by use of network-connected equipment such as computers, smartphones, tablet terminals, and television receivers. The equipment includes at least the client terminal 12 and can further include any one or all of the video input apparatus, the audio input apparatus, the haptic input apparatus, the video output apparatus, the audio output apparatus, and the haptic output apparatus.

The client terminal 12 encodes per frame each of the media signals obtained by the video input apparatus, the audio input apparatus, and the haptic input apparatus and transmits the coded data to the server 11. Meanwhile, the server 11 transmits the coded data obtained by encoding the video signals, the audio signals, and the haptic signals to the client terminal 12. Note that, in the ensuing description, for the purpose of simple explanation, only the coded data obtained by encoding the audio signals is assumed to be transmitted from the server 11.

Figure 11:
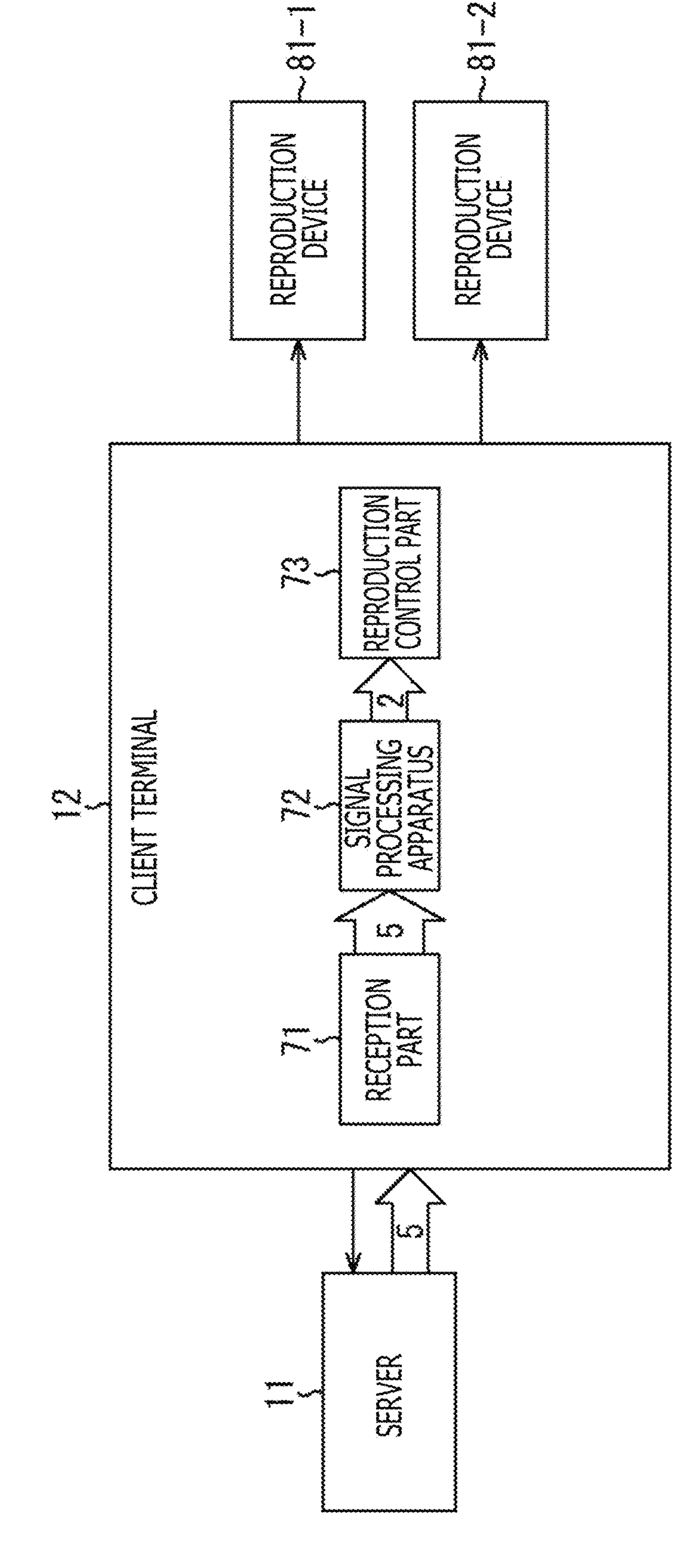
FIG. 11 is a block diagram depicting an exemplary configuration of the client terminal.

FIG. 11 is a block diagram depicting an exemplary configuration of the client terminal 12.

As depicted in FIG. 11, the client terminal 12 includes a reception part 71, a signal processing apparatus 72, and a reproduction control part 73.

The reception part 71 receives, for example, five pieces of coded data transmitted from the server 11 and supplies the received data to the signal processing apparatus 72.

From among the five pieces of coded data supplied from the reception part 71, the signal processing apparatus 72 selects the coded data targeted for combination. The signal processing apparatus 72 generates, for example, two audio signals by combining the coded data selected as the target for combination and supplies the generated audio signals to the reproduction control part 73.

The reproduction control part 73 supplies the audio signals to each of reproduction devices 81-1 and 81-2 connected to the client terminal 12, thereby causing these reproduction devices 81-1 and 81-2 to output sound reflecting the audio signals. Note that, in the case where the client terminal 12 is connected to the reproduction devices 81-1 and 81-2 by wireless communication, the reproduction control part 73 can transmit the coded data obtained by encoding the audio signals to the reproduction devices 81-1 and 81-2.

The reproduction devices 81-1 and 81-2 are each an audio output device including speakers of the equipment used by the remote audience or speakers connected to the equipment.

Figure 12:
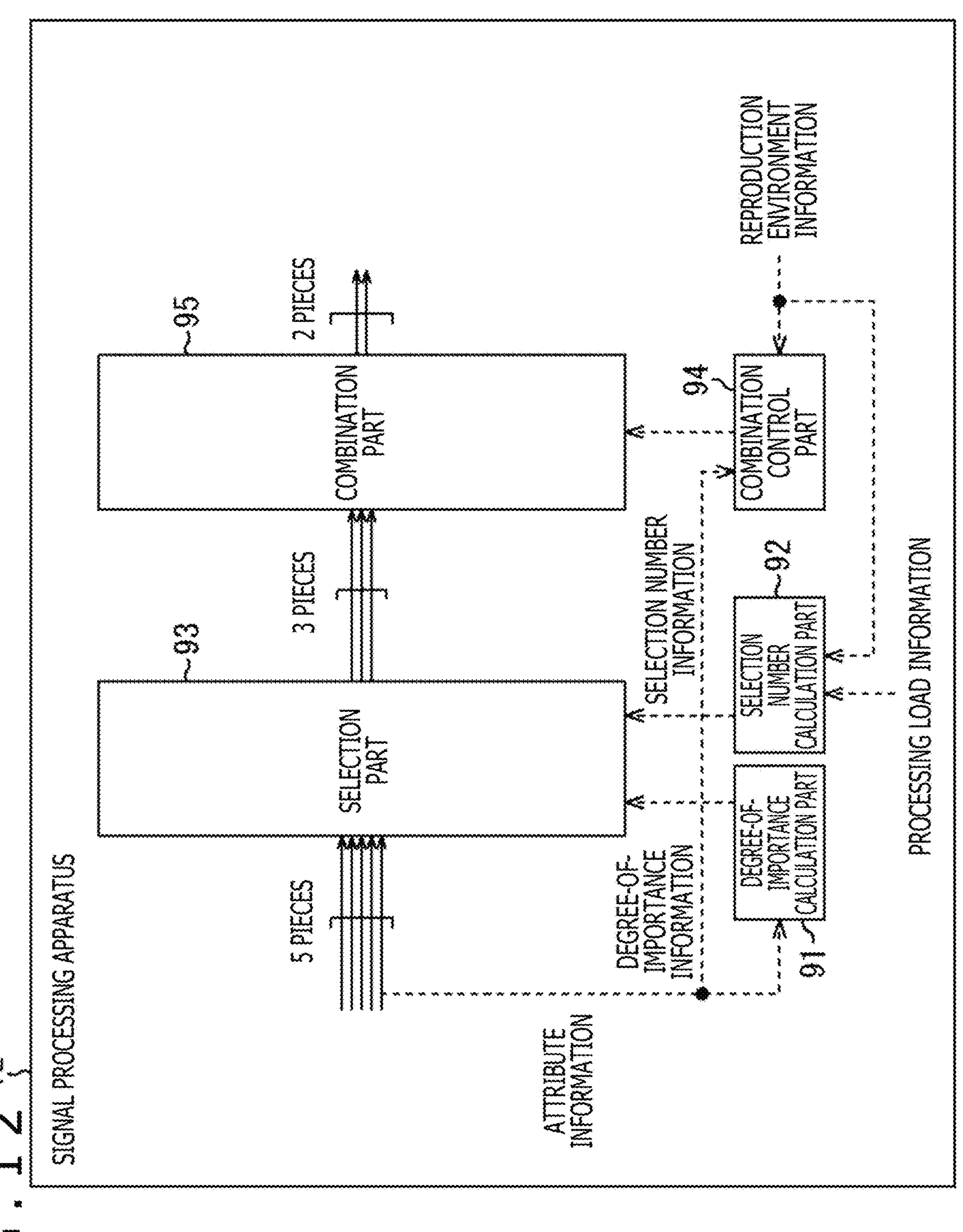
FIG. 12 is a view depicting another detailed exemplary configuration of the signal processing apparatus.

FIG. 12 is a view depicting a detailed exemplary configuration of the signal processing apparatus 72.

As depicted in FIG. 12, the signal processing apparatus 72 includes a degree-of-importance calculation part 91, a selection number calculation part 92, a selection part 93, a combination control part 94, and a combination part 95.

On the basis of the attribute information corresponding to each of five pieces of coded data supplied from the reception part 71, the degree-of-importance calculation part 91 calculates the degree of importance for each piece of the coded data. The attribute information indicative of attributes of the audio signals is attached to the coded data transmitted from the server 11.

The attributes of the audio signals inclusively indicate that the audio signals are those of the main music content of the remote live event, that the audio signals center on the reactions of the remote audience, and that the audio signals mix the main music content with the reactions of the remote audience.

The degree-of-importance calculation part 91 supplies the selection part 93 with degree-of-importance information indicative of the degree of importance calculated for each piece of the coded data on the basis of the attribute information attached thereto.

The selection number calculation part 92 calculates the number of pieces of coded data to be selected by the selection part 93 as the target for combination, the calculation being made on the basis of processing load information indicating the processing load of the client terminal 12 and reproduction environment information indicative of a reproduction environment for the audio signals, for example.

Specifically, in the case where there is some latitude in the processing load of the client terminal 12, the selection number calculation part 92 increases the number of pieces of the coded data targeted for combination; in the case where there is little latitude in the processing load, the selection number calculation part 92 reduces the number of pieces of the coded data targeted for combination. Also, the selection number calculation part 92 calculates the number of pieces of the coded data targeted for combination on the basis of the number of reproduction devices 81-1 and 81-2 providing the reproduction environment for the audio signals, the type of the reproduction devices 81-1 and 81-2, and their layout, for example.

The selection number calculation part 92 supplies the selection part 93 with selection number information indicative of the number of pieces of the coded data to be selected as the target for combination.

On the basis of the degree of importance calculated for each piece of the coded data by the degree-of-importance calculation part 91, the selection part 93 selects, without decoding, the coded data targeted for combination from among the pieces of coded data supplied from the reception part 71. For example, in the case where there is a need to select the coded data in view of an insufficient reproduction environment for the audio signals, the selection part 33 can preferentially select, as the target for combination, the coded data obtained by encoding the audio signals representing the main music content in a minimum required amount for the remote live event.

In the example in FIG. 12, three pieces of coded data are selected as the target for combination. Since the number of pieces of the coded data to be selected as the target for combination is determined on the basis of the processing load of the client terminal 12, it is possible to implement a remote live event with more realistic sensations in the case where there is some latitude in the processing load of the client terminal 12. Further, even in the case where there is little latitude in the processing load of the client terminal 12, it is possible to implement the remote live event stably with no intermittent or missing data. Note that, all five pieces of coded data transmitted from the server 11 may be selected as the target for combination.

The selection part 93 supplies the combination part 95 with the three pieces of coded data selected as the target for combination. The pieces of coded data not selected to be combined are discarded.

The combination control part 94 controls the combination part 95 in such a manner as to weight each piece of the coded data targeted for combination, according to the attribute information corresponding thereto and the reproduction environment information, before combining the coded data. For example, in the case where the reproduction device 81-1 includes two-channel speakers disposed in a television receiver while the reproduction device 81-2 includes two-channel neck-band speakers, the combination control part 94 controls the combination part 95 in such a manner that the audio signal for the reproduction device 81-1 is generated by use of the unmodified audio signals of the main music content and that the audio signal for the reproduction device 81-2 is generated by combining the audio signals centering on the reactions of the remote audience.

Under control of the combination control part 94, the combination part 95 combines the three pieces of coded data supplied from the selection part 93 and outputs two audio signals.

Figure 13:
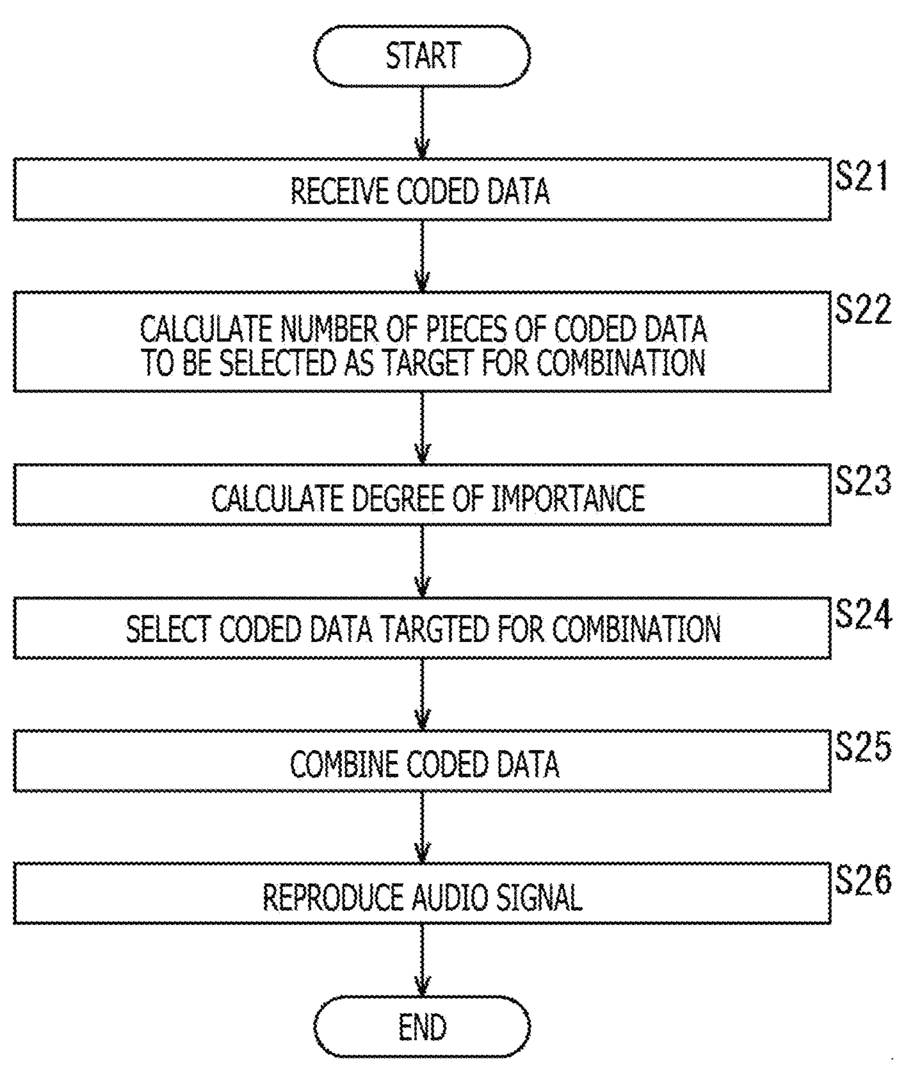
FIG. 13 is a flowchart explaining a process performed by the client terminal.

Explained next with reference to the flowchart of FIG. 13 is the process carried out by the client terminal 12 configured as described above.

In step S21, the reception part 71 receives the coded data transmitted from the server 11.

In step S22, the selection number calculation part 92 calculates the number of pieces of coded data to be selected as the target for combination.

In step S23, the degree-of-importance calculation part 91 calculates the degree of importance for each piece of the coded data received by the reception part 71, the calculation being made on the basis of the attribute information corresponding to each piece of the coded data.

In step S24, the selection part 93 selects the coded data targeted for combination from among the pieces of coded data received by the reception part 71, the selection being made without decoding the coded data on the basis of the degree of importance of each piece of the coded data.

In step S25, the combination part 95 generates the audio signal by combining the coded data under control of the combination control part 94.

In step S26, the reproduction control part 73 causes the reproduction devices 81-1 and 81-2 to reproduce the audio signal resulting from the combination.

As described above, the client terminal 12 selects, without decoding, the coded data targeted for combination from among a plurality of pieces of coded data transmitted from the server 11, decodes only the coded data selected as the target for combination, and combines the pieces of coded data thus decoded. This enables the client terminal 12 to implement a remote live event with highly realistic sensations through combination of numerous pieces of coded data while reducing the processing load and suppressing the concomitant delays.

4. Alternative Examples

The server 11 may combine the pieces of coded data in units of M divided groups obtained by dividing the performer and N−1 remote audience members. There is no need to equally divide the performer and the remote audience members into the M groups. Alternatively, the performer and the remote audience members may each belong to two or more of the M groups when divided thereinto. For example, the performer may belong to all of the M groups.

The server 11 receives N pieces of coded data transmitted from the client terminal 12 and combines the received pieces of data to generate five pieces of coded data for each of the M groups, for example. The server 11 transmits the five pieces of coded data generated for each of the groups to the client terminals 12 used by the remote audience members belonging to each group. Here, the same five pieces of coded data are transmitted to each of the client terminals 12 used by the remote audience members belonging to one group.

For example, in the case where the remote audience members are assigned to M blocks of virtual seats, the server 11 selects the pieces of coded data targeted for combination in units of seat blocks, before combining the selected pieces of data. This enables the server 11 to combine the pieces of coded data by emphasizing the reactions between the remote audience members whose virtual seat positions are close to each other.

Besides selecting the coded data for each virtual seat block, the server 11 can also combine the pieces of coded data in a manner customized for each group of family members or friends with a high degree of familiarity with each other, or for each remote audience member on the receiving side. Further, the server 11 can transmit the coded data combining only the coded data of the remote audience side to the client terminal 12-0 used by the performer.

FIG. 14 is a view depicting another detailed exemplary configuration of the signal processing apparatus 22. In FIG. 14, the same constituent elements as those in FIG. 6 are given the same reference signs. Redundant explanations are omitted where appropriate.

The configuration of the signal processing apparatus 22 in FIG. 14 is different from that of the signal processing apparatus 22 in FIG. 6 in that a first selection part 151 is provided and that second selection parts 152-1 through 152-M and combination parts 153-1 through 153-M are provided to replace the selection part 33 and the combination part 34. In the signal processing apparatus 22 in FIG. 14, M combinations of the second selection parts and combination parts carry out processing in parallel.

The first selection part 151 selects the pieces of coded data to be supplied to each of the second selection parts 152-1 through 152-M, on the basis of the attribute information corresponding to each of the N pieces of coded data transmitted from the client terminal 12.

Here, the attribute information corresponding to the coded data transmitted from the client terminal 12 indicates the degrees of relation between the remote audience members. The degrees of relation between the remote audience members include virtual seat positions assigned to the remote audience members on the coded data transmitting side, and degrees of familiarity between the remote audience members on the transmitting side on one hand and the other remote audience members on the other hand.

On the basis of the virtual seat positions of the remote audience members on the transmitting side, the first selection part 151 can determine the second selection parts 152-1 through 152-M to which to supply the coded data of the remote audience members on the transmitting side. For example, the first selection part 151 supplies the coded data of the remote audience members to whom are assigned the seat positions included in one seat block, to the same second selection part.

As a result, the pieces of coded data of the remote audience members whose seat positions are close to each other are preferentially selected as the target for combination in a subsequent configuration, whereas the pieces of coded data of the remote audience members whose seat positions are far from one another are not targeted for combination. Here, the combination parts 153-1 through 153-M combine the pieces of coded data in units of virtual seat blocks.

Note that, the virtual seat positions of the remote audience members are linked to their connection IDs by an event organizer upon registration of their attendance to a remote live event, for example.

Further, on the basis of the degree of familiarity between the remote audience members on the transmitting side on one hand and the other remote audience members on the other hand, the first selection part 151 can determine the second selection parts 152-1 through 152-M to which to supply the coded data of the remote audience members on the transmitting side. For example, the first selection part 151 supplies the coded data of the remote audience members belonging to a group including close friends to the same second selection part.

As a result, the pieces of coded data of the remote audience members belonging to the same group are preferentially selected as the target for combination in a subsequent configuration. Here, the combination parts 153-1 through 153-M combine the pieces of coded data in units of groups. This means that the remote audience members belonging to the same group can converse with each other.

Note that, for example, in the case of a group including close friends expected to book seats next to each other when attending a remote live event, the degrees of relation between the remote audience members on the transmitting side on one hand and the other remote audience members on the other hand are linked to their connection IDs by the event organizer upon registration of their attendance to the remote live event.

As described above, the first selection part 151 selects the combinations of the second selection parts and the combination parts to which to supply the pieces of coded data yet to be combined, on the basis of the degrees of relation between the remote audience members on the side of transmitting the coded data before combination on one hand, and the remote audience members on the side of receiving the coded data after combination on the other hand.

In the example in FIG. 14, the second selection parts 152-1 through 152-M are each supplied with N/M pieces of coded data.

The degree-of-importance calculation part 31 calculates the degree of importance for each piece of the coded data on the basis of the attribute information that is indicative of the feature quantities of the audio signals and that is attached to each piece of coded data supplied from the first selection part 151 to the second selection parts 152-1 through 152-M. The degree-of-importance calculation part 31 supplies each of the second selection parts 152-1 through 152-M and each of the combination parts 153-1 through 153-M with degree-of-importance information indicative of the degrees of importance calculated of the pieces of coded data to be supplied to each of the second selection parts 152-1 through 152-M.

The selection number calculation part 32 calculates the number of pieces of coded data to be selected by the second selection parts 152-1 through 152-M as the target for combination, on the basis of processing load information and communication load information, for example. The selection number calculation part 32 supplies the selection number information thus obtained to the second selection parts 152-1 through 152-M.

On the basis of the degree of importance calculated by the degree-of-importance calculation part 31 for each piece of the coded data, the second selection parts 152-1 through 152-M select, without decoding, the coded data targeted for combination from among the pieces of coded data supplied from the first selection part 151.

In the example in FIG. 14, N/M/100 pieces of coded data are selected as the target for combination by each of the second selection parts 152-1 through 152-M. Note that, all of the N/M pieces of coded data supplied from the first selection part 151 may be selected as the target for combination.

The second selection parts 152-1 through 152-M supply the N/M/100 pieces of coded data selected as the target for combination to the corresponding ones of the combination parts 153-1 through 153-M.

The pieces of coded data not selected as the target for combination are discarded.

The combination parts 153-1 through 153-M weight the N/M/100 pieces of coded data supplied from the second selection parts 152-1 through 152-M, according to the degrees of importance calculated for these pieces of coded data, and combine the pieces of coded data thus weighted into five pieces of coded data for output.

In the case where the pieces of coded data are generated in a manner customized for each of the remote audience members on the receiving side, the combination parts 153-1 through 153-M can weight the pieces of coded data targeted for combination, according to the distance between the virtual seat position of a remote audience member on the side of transmitting the pieces of coded data to be combined on one hand and the virtual seat position of a remote audience member to whom the combined pieces of coded data are transmitted on the other hand, and combine the pieces of coded data thus weighted.

Note that, the second selection parts 152-1 through 152-M and the combination parts 153-1 through 153-M may not be disposed in the same server as that of the first selection part 151. Instead, these parts may be provided on a distributed basis in a plurality of servers. This makes it possible to spread the server processing load across the plurality of servers. The risk of server breakdown can also be spread.

Notes on the Computer

The series of the processes described above can be executed either by hardware or by software. In the case where these processes are to be carried out by software, the program constituting the software is installed from a program recording medium into a computer built with dedicated hardware or into a general-purpose personal computer, for example.

FIG. 15 is a block diagram depicting an exemplary hardware configuration of a computer that executes the above-described series of processes with use of programs. The server 11 and the client terminal 12 each include a PC having a configuration similar to that depicted in FIG. 15, for example.

A CPU (Central Processing Unit) 501, a ROM (Read Only Memory) 502, and a RAM (Random Access Memory) 503 are interconnected via a bus 504.

The bus 504 is further connected with an input/output interface 505. The input/output interface 505 is connected with an input part 506 including a keyboard, a mouse, and the like and with an output part 507 including a display, speakers, and the like. The input/output interface 505 is further connected with a storage part 508 including a hard disk, a nonvolatile memory, and the like, with a communication part 509 including a network interface and the like, and with a drive 510 for driving a removable medium 511.

In the computer configured as described above, the CPU 501 performs the above-mentioned series of processes by, for example, loading appropriate programs from the storage part 508 into the RAM 503 via the input/output interface 505 and the bus 504 and by executing the loaded programs.

The programs to be executed by the CPU 501 are recorded, for example, on the removable medium 511 when offered for installation into the storage part 508. The programs are alternatively offered via a wired or wireless transmission medium such as a local area network, the Internet, and digital satellite broadcasting, before being installed into the storage part 508.

The programs executed by the computer may each be processed chronologically, i.e., in the sequence explained in this description, in parallel with other programs, or in otherwise appropriately timed fashion such as when the program is invoked as needed.

Note that, in this description, the term "system" refers to an aggregate of a plurality of constituent elements (e.g., apparatuses or modules (parts)). It does not matter whether or not all constituent elements are housed in the same enclosure. Thus, a system includes a plurality of apparatuses housed in separate enclosures and interconnected via a network or a single apparatus in a single enclosure that houses a plurality of modules.

Note that, the advantageous effects stated in this description are only examples and not limitative of the present technology that may provide other advantages as well.

The present technology is not limited to the preferred embodiments discussed above and can be implemented in diverse variations so far as they are within the scope of the present technology.

For example, the present technology can be implemented as a cloud computing setup in which a single function is processed cooperatively by a plurality of networked apparatuses on a shared basis.

Also, each of the steps discussed in reference to the above-described flowcharts can be executed either by a single apparatus or by a plurality of apparatuses on a shared basis.

Furthermore, in the case where a single step includes a plurality of processes, these processes included in the single step can be executed either by a single apparatus or by a plurality of apparatuses on a shared basis.

Exemplary Combinations of the Configured Components

The present technology can also be implemented in the following configurations.

(1)

A signal processing apparatus including:

a selection part configured to select, from among a plurality of pieces of coded data obtained by encoding a plurality of media signals, pieces of the coded data targeted for combination without decoding the pieces of coded data; and a combination part configured to combine the pieces of coded data selected as the target for combination.

(2)

The signal processing apparatus according to (1) above, in which the selection part selects the pieces of coded data targeted for combination on the basis of a degree of importance calculated for each piece of the coded data.

(3)

The signal processing apparatus according to (2) above, in which the degree of importance is calculated on the basis of attribute information corresponding to the coded data.

(4)

The signal processing apparatus according to (3) above, in which the signal processing apparatus is included in a server connected with a plurality of terminals individually used by a plurality of users, and the plurality of pieces of coded data are data transmitted from each of the plurality of terminals.

(5)

The signal processing apparatus according to (4) above, in which the attribute information indicates feature quantities of the media signals.

(6)

The signal processing apparatus according to (5) above, in which the attribute information is information attached to the coded data when transmitted from the terminals.

(7)

The signal processing apparatus according to (5) or (6) above, in which the feature quantities of the media signals include at least a size, a degree of change, or a type of the media signals.

(8)

The signal processing apparatus according to (4) above, in which the attribute information indicates a degree of relation between the user of any of the terminals transmitting the coded data on one hand and the user of any of the terminals to which the combined coded data is transmitted on the other hand.

(9)

The signal processing apparatus according to (8) above, in which the selection part selects the pieces of coded data targeted for combination in units of groups to which the users of the terminals transmitting the coded data belong, the groups being indicated by the attribute information.

(10)

The signal processing apparatus according to any of (4) through (9) above, in which the selection part selects the number of pieces of the coded data targeted for combination which number corresponds to at least either a processing load of the server or a load of communication with the terminals.

(11)

The signal processing apparatus according to any of (2) through (10) above, in which the combination part weights, before combining, the pieces of coded data selected as the target for combination, the weighting being made according to the degree of importance.

(12)

The signal processing apparatus according to any of (1) through (11) above, in which the combination part combines frequency signals obtained by decoding the coded data and encodes the combined frequency signals without converting them to time signals.

(13)

The signal processing apparatus according to (3) above, in which the signal processing apparatus is included in a terminal connected with a server that repeats transmission of the coded data, and the plurality of pieces of coded data are data transmitted from the server.

(14)

The signal processing apparatus according to (13) above, in which the attribute information indicates attributes of the media signals.

(15)

The signal processing apparatus according to (14) above, in which the attribute information is information attached to the coded data when transmitted from the server.

(16)

The signal processing apparatus according to any of (13) through (15) above, in which the selection part selects the number of pieces of the coded data targeted for combination which number corresponds to at least either a processing load of the terminal or a reproduction environment for the combined media signals.

(17)

The signal processing apparatus according to any of (13) through (16) above, in which the combination part weights, before combining, the pieces of coded data according to the attribute information and a reproduction environment for the combined media signals.

(18)

The signal processing apparatus according to any of (1) through (17) above, in which the media signals include at least a video signal, an audio signal, or a haptic signal.

(19)

The signal processing apparatus according to any of (1) through (18) above, in which the pieces of coded data not selected as the target for combination are discarded.

(20)

A signal processing method for causing a signal processing apparatus to perform:

selecting, from among a plurality of pieces of coded data, pieces of the coded data targeted for combination without decoding the pieces of coded data; and combining media signals obtained by decoding the pieces of coded data selected as the target for combination.

REFERENCE SIGNS LIST

11: Server
12: Client terminal
21: Reception part
22: Signal processing apparatus
23: Transmission part
31: Degree-of-importance calculation part
32: Selection number calculation part
33: Selection part
34: Combination part
51-1, 51-2: Decoding part
53: Weighted addition part
55: Re-encoding part
71: Reception part
72: Signal processing apparatus
73: Reproduction control part
91: Degree-of-importance calculation part
92: Selection number calculation part
93: Selection part
94: Combination control part

95: Combination part

151: First selection part

152-1 to 152-M: Second selection part

153-1 to 153-M: Combination part

The invention claimed is:

1. A signal processing apparatus, comprising: a central processing unit (CPU) configured to: receive a plurality of pieces of coded data, wherein the plurality of pieces of coded data is associated with a plurality of media signals, and each of the plurality of media signals is encoded; select, from the plurality of pieces of coded data, a first set of pieces of coded data without the first set of pieces of coded data being decoded; and combine the first set of pieces of coded data based on a weighted addition of the first set of pieces of coded data, wherein the combining comprises decoding the first set of pieces of coded data to generate a plurality of frequency signals, combine the plurality of frequency signals, and encode the combined plurality of frequency signals without conversion of the combined plurality of frequency signals to time signals.

2. The signal processing apparatus according to claim 1, wherein the CPU is further configured to: determine a respective degree of importance for each of the plurality of pieces of coded data; and select the first set of pieces of coded data based on the respective degree of importance calculated for each of the plurality of pieces of coded data.

3. The signal processing apparatus according to claim 2, wherein the CPU is further configured to: determine the respective degree of importance for each of the plurality of pieces of coded data based on a plurality of pieces of attribute information, and each of the plurality of pieces of attribute information corresponds to a respective piece of coded data of the plurality of pieces of coded data.

4. The signal processing apparatus according to claim 3, wherein a server includes the signal processing apparatus, the server is connected with a plurality of terminal devices, each of the plurality of terminal devices is associated with a respective user of a plurality of users, the plurality of terminal devices includes a first set of terminal devices and a second set of terminal devices, and the first set of terminal devices transmits the plurality of pieces of coded data to the signal processing apparatus.

5. The signal processing apparatus according to claim 4, wherein the plurality of pieces of attribute information indicates a plurality of feature quantities of the plurality of media signals.

6. The signal processing apparatus according to claim 5, wherein the first set of terminal devices attaches, at a time of the transmission of the plurality of pieces of coded data, the plurality of pieces of attribute information to the plurality of pieces of coded data.

7. The signal processing apparatus according to claim 5, wherein the plurality of feature quantities includes at least one of a respective size of each of the plurality of media signals, a respective degree of change of the each of the plurality of media signals, or a respective type of the each of the plurality of media signals.

8. The signal processing apparatus according to claim 4, wherein the CPU is further configured to control transmission, to the second set of terminal devices, of the combined first set of pieces of coded data, the first set of terminal devices is associated with a first set of users of the plurality of users, the second set of terminal devices is associated with a second set of users of the plurality of users, and the plurality of pieces of attribute information indicates a degree of relation between the first set of users and the second set of users.

9. The signal processing apparatus according to claim 8, wherein the first set of users includes a plurality of groups, the CPU is further configured to select the first set of pieces of coded data based on the plurality of groups, and the plurality of pieces of attribute information further indicates the plurality of groups.

10. The signal processing apparatus according to claim 4, wherein a number of the first set of pieces of coded data corresponds to at least one of a processing load of the server, or a load of communication with the plurality of terminal devices.

11. The signal processing apparatus according to claim 2, wherein the CPU is further configured to weight, before the combination of the first set of pieces of coded data, each of the first set of pieces of coded data based on the respective degree of importance.

12. The signal processing apparatus according to claim 3, wherein the signal processing apparatus is included in a terminal device, the terminal device is connected with a server, and the server transmits the plurality of pieces of coded data to the signal processing apparatus.

13. The signal processing apparatus according to claim 12, wherein the plurality of pieces of attribute information indicates a plurality of attributes of the plurality of media signals.

14. The signal processing apparatus according to claim 13, wherein the server attaches, at a time of the transmission of the plurality of pieces of coded data, the plurality of pieces of attribute information to the plurality of pieces of coded data.

15. The signal processing apparatus according to claim 12, wherein a number of the first set of pieces of coded data corresponds to at least one of: a processing load of the terminal device, or a reproduction environment for the combined plurality of media signals.

16. The signal processing apparatus according to claim 12, wherein the CPU is further configured to: weight, before the combination of the first set of pieces of coded data, each of the first set of pieces of coded data based on each of the plurality of pieces of attribute information and a reproduction environment for the combined plurality of media signals.

17. The signal processing apparatus according to claim 1, wherein the plurality of media signals includes at least one of a video signal, an audio signal, or a haptic signal.

18. The signal processing apparatus according to claim 1, wherein the plurality of pieces of coded data includes a second set of pieces of coded data, the second set of pieces of coded data is different from the first set of pieces of coded data, and the CPU is further configured to discard the second set of pieces of coded data from the combination of the first set of pieces of coded data.

19. A signal processing method comprising:

in a signal processing apparatus;

receiving a plurality of pieces of coded data, wherein the plurality of pieces of coded data is associated with a plurality of media signals, and each of the plurality of media signals is encoded; selecting, from the plurality of pieces of coded data, a set of pieces of coded data without decoding the set of pieces of coded data; and combining the first set of pieces of coded data based on a weighted addition of the set of pieces of coded data, wherein the combining comprises decoding the first set of pieces of coded data to generate a plurality of frequency signals, combine the plurality of frequency signals and encode the combined plurality of frequency signals without conversion of the combined plurality of frequency signals to time signals.

* * * * *